United States Patent [19]

Sakai et al.

[11] Patent Number: 5,739,976
[45] Date of Patent: Apr. 14, 1998

[54] MAGNETIC RECORDING AND REPRODUCING APPARATUS

[75] Inventors: Kazuo Sakai, Ibaraki-ken; Fumio Takeda, Ushiku; Taichiro Yamashita; Fujio Tajima, both of Tsuchiura; Takao Terayama, Ushiku; Tomokazu Ishii, Ibaraki-ken; Kooetsu Okuyama, Tsuchiura; Takayuki Munemoto, Ibaraki-ken; Nobuyuki Kaku, Kanagawa-ken; Kenmei Masuda, Yokohama; Shigeyuki Kobata, Odawara; Fukuyasu Abe, Fujisawa; Kenji Ogiro, Yokohama; Shigemitsu Higuchi, Fujisawa, all of Japan

[73] Assignee: Hitachi, Ltd., Tokyo, Japan

[21] Appl. No.: 550,226

[22] Filed: Oct. 30, 1995

Related U.S. Application Data

[63] Continuation of Ser. No. 118,401, Sep. 9, 1993, abandoned.

[30] Foreign Application Priority Data

Sep. 9, 1992 [JP] Japan .................... 4-240367
Sep. 18, 1992 [JP] Japan .................... 4-249566

[51] Int. Cl.⁶ .................................... G11B 15/67
[52] U.S. Cl. .................................... 360/85
[58] Field of Search .............. 360/95, 85; 242/195, 242/348, 348.3, 358

[56] References Cited

U.S. PATENT DOCUMENTS

| | | | |
|---|---|---|---|
| 3,818,503 | 6/1974 | Hosono et al. | 360/85 |
| 3,918,092 | 11/1975 | Rueger | 360/85 |
| 4,652,946 | 3/1987 | Ryan | 360/85 |
| 4,779,150 | 10/1988 | Grant | 360/85 |
| 5,003,416 | 3/1991 | Bumb | 360/95 |
| 5,128,815 | 7/1992 | Leonhardt et al. | 360/85 |
| 5,202,809 | 4/1993 | Dodt et al. | 360/95 |
| 5,243,477 | 9/1993 | Grant et al. | 360/95 |

Primary Examiner—Robert S. Tupper
Attorney, Agent, or Firm—Antonelli, Terry, Stout, & Kraus, LLP

[57] ABSTRACT

As a method of increasing the storage capacity of a magnetic recording and reproducing apparatus for recording and reproducing information to and from a magnetic tape in a cartridge, there is a helical scan recording method in which the magnetic tape is diagonally wound around a drum which rotates a magnetic head. With an apparatus adapted to this method, the disposition of the cartridge and the take-up reel for taking up the magnetic tape on the same plane arises a necessity of considerably bending the magnetic tape at the drum portion and, accordingly, the magnetic tape is damaged. In order to prevent the damage of the foregoing type, the tape passage surface from the cartridge to the drum and the tape passage from the drum to the take-up reel are formed by an angle at which the direction in which the magnetic tape is moved is changed due to winding of the magnetic tape around the drum so that the magnetic tape is not bent excessively. A threading device capable of three-dimensionally controlling the position of the magnetic tape in accordance with a predetermined tape passage is provided for the apparatus structured as described above. The threading device is formed by a link mechanism to be moved along the locus of a cam groove so that the three-dimensional position control can be performed.

2 Claims, 23 Drawing Sheets

MAGNETIC RECORDING AND REPRODUCING APPARATUS

This application is a continuation application of Ser. No. 08/118,401, filed Sep. 9, 1993, now abandoned.

BACKGROUND OF THE INVENTION

The present invention relates to a magnetic recording and reproducing apparatus for recording and reproducing information to and from a magnetic recording medium (hereinafter called a "magnetic tape") accommodated in a cartridge in such a manner that information is recorded and reproduced diagonally (hereinafter called a "helical scan recording method") with respect to the longitudinal direction of a magnetic tape while lowering the error rate and lengthening the life of the magnetic tape, and the present invention relates to a tape threading device for loading the magnetic tape accommodated in the cartridge into the magnetic recording and reproducing apparatus.

Hitherto, a parallel recording method has been, as a conventional magnetic recording and reproducing method by making use of a magnetic tape accommodated in a cartridge, known which has an arrangement that information is recorded and reproduced in parallel to the longitudinal direction of the magnetic tape. In a magnetic recording and reproducing apparatus adapted to the parallel recording method, a leading block of the magnetic tape wound around a reel accommodated in the cartridge is pulled out to pass through air bearing guides, which are respectively disposed in front of a fixed head and in the rear of the same, the fixed head and rollers, followed by setting the leading block to the hub of a take-up reel. Then, the magnetic tape is moved forward or reversely between a supply reel shaft and a take-up reel shaft while controlling the speed and the tension of the magnetic tape. It should be noted that the tape movement passage is formed two-dimensionally on the same plane from the supply reel to the take-up reel.

The threading mechanism must be adaptable to the predetermined movement passage provided for the magnetic recording and reproducing apparatus.

However, the parallel recording method encounters a difficulty in developing a dense magnetic head for increasing the number of tracks per width of the magnetic tape in order to meet the needs in the market for large recording capacities of one magnetic tape. Therefore, the parallel recording method has not been expected to realize dense recording enabled by the helical recording method.

There have been disclosed in Japanese Patent Unexamined Publication No. 58-73052 a magnetic tape movement system of a magnetic recording and reproducing apparatus adapted to the parallel recording method and a threading mechanism comprising a panto-arm having a foldable arm for guiding the leading block of the magnetic tape along the tape movement system and a cam groove for determining the radius from the rotation position of the panto-arm.

SUMMARY OF THE INVENTION

An object of the present invention is to provide a magnetic recording and reproducing apparatus using a rotative head to perform helical scan recording as to recording information at a high density and having a reliable passage exhibiting a long life against passing of the magnetic tape and passing stability.

Another object of the present invention is to provide a magnetic recording and reproducing apparatus having a tape threading device which is adaptable to a three-dimentional spiral tape passage developing in the direction of the height.

In order to record information onto a magnetic tape at a high density, a high-density head must be developed with the conventional fixed head technology to increase the number of tracks. However, it is difficult to put into practical use a high density head exhibiting a high density, which is ten or more times the present density and which compares with the helical recording method.

On the other hand, the helical recording method in which one or more rotative magnetic heads are mounted on a drum (hereinafter called a "rotative drum"), the magnetic tape is diagonally wound around the drum to record and reproduce information diagonally to the longitudinal direction of the magnetic tape and in the straight-line manner is suitable to record information at high density because information can be recorded on the magnetic tape at a fine pitch.

A video tape recorder (VTR) or the like adapted to the helical recording method uses a cassette tape in which the magnetic tape is set between a supply reel and a take-up reel accommodated in the same plane therein, and the drum having the rotative drum mounted thereon is disposed while inclining its shaft with respect to the widthwise direction of the tape wound between the two reels, and the magnetic tape is pulled out of the tape cassette to diagonally wind the rotative drum while inclining the tape surface to pass along the drum surface.

Therefore, the foregoing method encounters a problem that, when the guide rollers disposed at the drum inlet side and the outlet side are used to previously press downwards, on the drum, the tape in the widthwise direction of the tape to make the magnetic tape coincide with the guide portion of the lower end of the tape edge, use of the guide to restrict the widthwise directional change occurring at the time of passing the tape causes the tape edge to easily be damaged.

In a case where a magnetic recording and reproducing apparatus using the cartridge has an arrangement that the supply reel and the take-up reel are present on the same plane, a complicated mechanism must be used to pull the magnetic tape out of the cartridge, and the passage surface is so inclined as to move the magnetic tape along the rotative drum diagonally inclined with respect to the widthwise direction of the magnetic tape to stably wind the magnetic tape. Further, the edge of the magnetic tape can easily be damaged because of a similar reason.

The present invention is so arranged that the magnetic tape is wound around the drum and taken up around the take-up reel without inclining the passage surface of the magnetic tape pulled out of the cartridge in a direction outside the surface in the widthwise direction of the tape so that the magnetic tape is protected from damage.

According to one aspect of the present invention, a magnetic recording and reproducing apparatus having cylindrical drum provided with a magnetic head for recording and reproducing information to and from a magnetic tape while being rotated and a take-up reel for taking up the magnetic tape has an arrangement that the rotational shaft of the supply reel for rotating the supply reel around which the magnetic tape to be arranged to the take-up reel is wound along the passage (hereinafter called a "tape path") and the rotational shaft of the take-up reel for rotating the take-up reel are disposed to be inclined to each other.

An angle made by the rotational shaft of the supply reel and the rotational shaft of the take-up reel, which are disposed while being inclined, may the sum of an angle made by the rotational shaft of the rotative drum and the rotational shaft of the supply reel and an angle made by the rotational shaft of the rotative drum and the rotational shaft of the take-up reel.

A passage, through which the magnetic tape arranged from the supply reel to the take-up reel by way of the rotative drum passes, is arranged such that a portion of the passage from the supply reel to the rotative drum and a portion of the passage from the rotative drum to the take-up reel are so respectively constituted as to cause the widthwise direction of the magnetic tape in each passage to face the same direction.

By disposing the rotational shafts of the two reels while inclining them, each of the tape paths from the rotative drum having the rotative head to the supply reel and to the take-up reel can be formed on the same plane perpendicular to the widthwise direction of the magnetic tape. Therefore, the magnetic tape can be moved while preventing application of excessive force to the magnetic tape. As a result, the accuracy at that time of passing the tape can be improved and the edge of the magnetic tape can be protected from damage.

The foregoing magnetic recording and reproducing apparatus may be provided with tension detection means so that the supply reel and the take-up reel are driven such that the tension of the magnetic tape is controlled in response to a signal supplied from the tension detection means so that the magnetic tape is moved.

By directory controlling the tension of the magnetic tape by using the supply reel and the take-up reel to passing the magnetic tape while detecting the tension of the magnetic tape as described above, the capstan for passing the magnetic tape and its drive motor can be omitted.

The foregoing magnetic recording and reproducing apparatus may be so arranged that the supply reel, the rotative drum and the take-up reel are disposed to form a substantially straight line. The disposing order must be made such that the supply reel, the rotative drum and the take-up reel are disposed in this sequential order.

By disposing the supply reel, the rotative drum and the take-up reel to form a substantially straight line starting from the cartridge insertion side, the motor portion is disposed outside even if the shaft of the take-up reel is inclined. Therefore, interference with the drum motor can be prevented, the width of the apparatus can be narrowed, and the size of the apparatus can be reduced.

The foregoing magnetic recording and reproducing apparatus may comprise a plurality of guides, which are able to come closer and move away from the rotative drum or which are able to come closer and move away from the rotative drum and as well as moves in the widthwise direction of the magnetic recording medium as the guides comes closer and moves away from the rotative drum, and which winds the magnetic tape around the rotative drum, the plurality of the guides being disposed adjacent to the rotative drum.

Since the guides are moved away from the magnetic tape at the time of setting the magnetic tape and they are loaded to predetermined positions after the magnetic tape has been loaded as described above, loading of the magnetic tape is not interrupted.

The present invention is arranged so that the inclined pin is not used in the tape passage system and the plural guide groups are to be disposed in the tape passage are not shifted but their positions are fixed.

According to another aspect of the present invention, there is provided a magnetic recording and reproducing apparatus into which a magnetic tape accommodated around a supply reel in a cartridge is loaded to record and reproduce information to and from the magnetic tape, the magnetic recording and reproducing apparatus comprising:

a cylindrical drum having a plurality of magnetic heads for recording and reproducing information to and from the magnetic tape while being rotated, the cylindrical drum being arranged to spirally wind the magnetic tape around the outer surface thereof;

a take-up reel for taking up the magnetic tape;

a leading block disposed at the leading portion of magnetic tape accommodated in the cartridge and arranged to pull out the magnetic tape; and a plurality of tape guides so disposed as to cause the magnetic tape to form a predetermined tape passage, wherein an extension line of a segment passing from the center of rotation of the drum to the center of a circular arc of the outer surface of a portion of the drum, around which the magnetic tape is wound, and a segment formed by the rear side of the cartridge intersect.

The plural tape guides forming a predetermined tape passage are not moved at the time of loading or unloading the tape.

The tape guides are so disposed as to make an angle of winding of the magnetic tape around plural tape guides disposed most adjacently to the drum is 90° or less.

As a result of the structure of the apparatus, winding of the magnetic tape around the rotative head device can be realized by one-directional tape pulling-out operation. Since the angle of winding the magnetic tape around the tape guide can be reduced and since the tape passage system has no inclined pin, the tape is not twisted. Therefore, tape passing load can be reduced and, accordingly stable tape passing can be realized.

The shape of a portion of each of the plural tape guides for guiding the magnetic tape, that comes in contact with the magnetic tape, is formed into a circular arc and the shape is composed of a plurality of circular arcs and straight lines.

As a result, area of contact with the tape can be enlarged so that the tape pressure can be lowered. Therefore, the quantity of floating of the tape realized by jetting air can be enlarged and, accordingly, friction of the tape can be reduced.

Further, the take-up reel and the drum are disposed on the opposite side to the direction in which the cartridge is inserted.

As a result of the configuration thus-made, the thickness of the magnetic recording and reproducing apparatus can be thinned.

The present invention enables the magnetic tape to be properly loaded, the magnetic tape being arranged along a tape path which is formed in the magnetic recording and reproducing apparatus according to the present invention and which is changed three-dimensionally to the take-up reel by way of the rotative drum.

According to another aspect of the present invention, the magnetic tape threading means of a magnetic recording and reproducing apparatus for pulling out the magnetic tape accommodated in a cartridge to set the magnetic tape along the tape path has arm means having a movement end which hooks the leading portion of the tape from the cartridge and which is extended/contracted with respect to another fixed end, vertical movement means for vertically moving the arm means, and rotation means for rotating the arm means.

The vertical movement means is, in other words, means for determining the vertical position of the movement end (the leading portion) of the arm means. The rotation means is, in other words, means for determining the horizontal position of the movement end of the arm means.

The arm means is composed of a link mechanism, and a portion of the link mechanism is engaged with a groove of an individual member of the threading device, the member having the groove. The rotation realized by the rotation means moves the portion engaged with the groove so that the arm means is extended and contracted.

By constituting the arm means by the link mechanism and by rotating the link mechanism by the rotation means and the vertical means while using the groove formed in the member having the groove as a guide to rotate and vertically-move the arm, the leading portion of the tape fastened to the leading portion of the arm can be three-dimensionally guided to pass along the threading path.

A portion of the link mechanism to be engaged with the groove may vertically hold the groove. In this case, the engagement between the link mechanism and the groove can be stabilized and the movement of the leading portion of the arm means can be stabilized.

It is preferable that the tape loading device comprises a motor for rotating the supply reel disposed in cartridge; a motor for rotating the drum; a motor for rotating the take-up reel; a motor for rotating the arm means; and control means for controlling rotation of each of the motors.

By providing the control means for each motor, rotation, stoppage and the rotational speed of each motor can be controlled to be adaptable to the threading state of the magnetic tape. Therefore, the tape can be loaded into the magnetic recording and reproducing apparatus on good condition.

The tape threading device may be so arranged as to comprise a tape guide means which is positioned away from the rotative drum until the leading portion of the tape passes a position adjacent to the rotative drum and the tape guide means is moved to a position adjacent to the rotative drum to locate the tape, wherein the tape is diagonally wound around the rotative drum, and then the leading portion of the tape is connected to the take-up reel.

As a result, winding of the tape around the rotative drum can be performed assuredly.

Other and further objects, features and advantages of the invention will be appear more fully from the following description.

DESCRIPTION OF THE EMBODIMENTS

Embodiments of the present invention will now be described with reference to the accompanying drawings.

Figure 1:
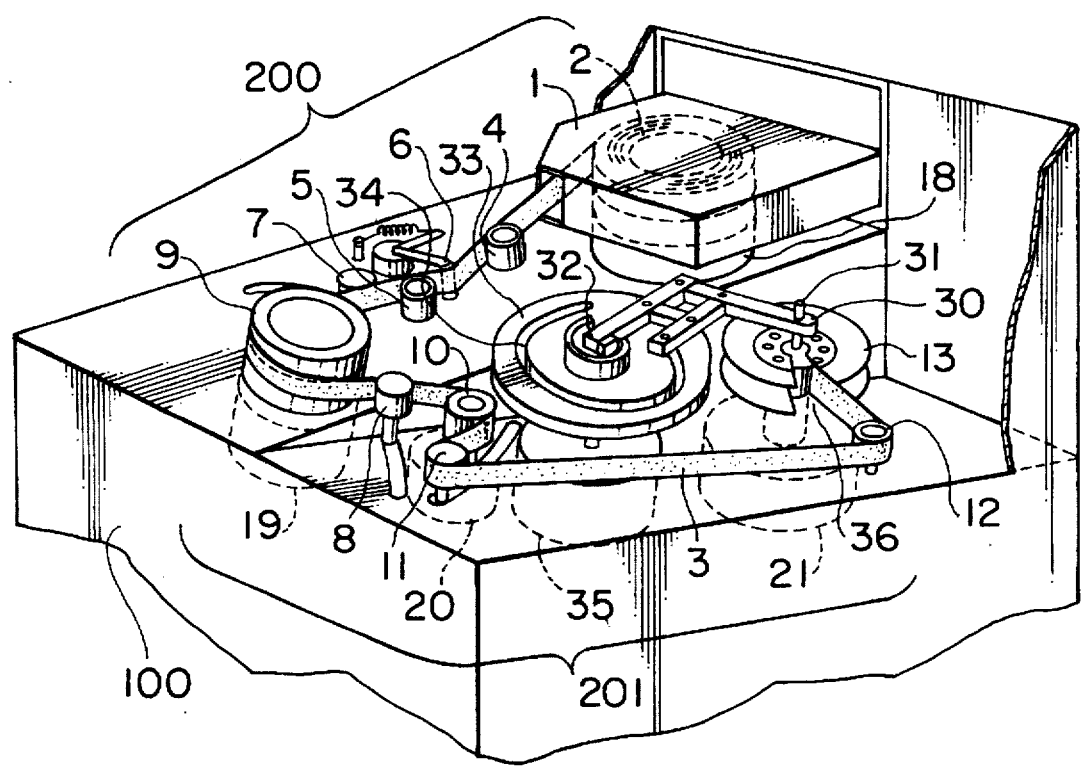
FIG. 1 is a schematic perspective view which illustrates a tape path portion of a magnetic recording and reproducing apparatus according to an embodiment of the present invention.

FIG. 1 is a schematic perspective view which illustrates a tape path portion of a magnetic recording and reproducing apparatus 100 according to an embodiment of the present invention. FIG. 1 illustrates a state where a cartridge is loaded and a magnetic tape is set to the tape path portion by a tape threading device.

A cartridge 1 is loaded into a cartridge receiving portion of the magnetic recording and reproducing apparatus 100. The tape path portion is composed of a first tape path 200 formed from a supply roll 2 an inlet guide 7 of a rotative drum 9 and a second tape path 201 formed from an outlet guide 8 of the rotative drum 9 to a take-up reel 13. Each of the tape paths 200 and 201 is formed by a passage surface (hereinafter called a "same passage surface") perpendicular to the widthwise direction of the tape and facing the widthwise direction of the tape. The two passage surfaces (e.g., tap tape edges of a first passage surface and a second passage surface) formed by the corresponding tape paths 200 and 201 make a predetermined angle.

Figure 3:
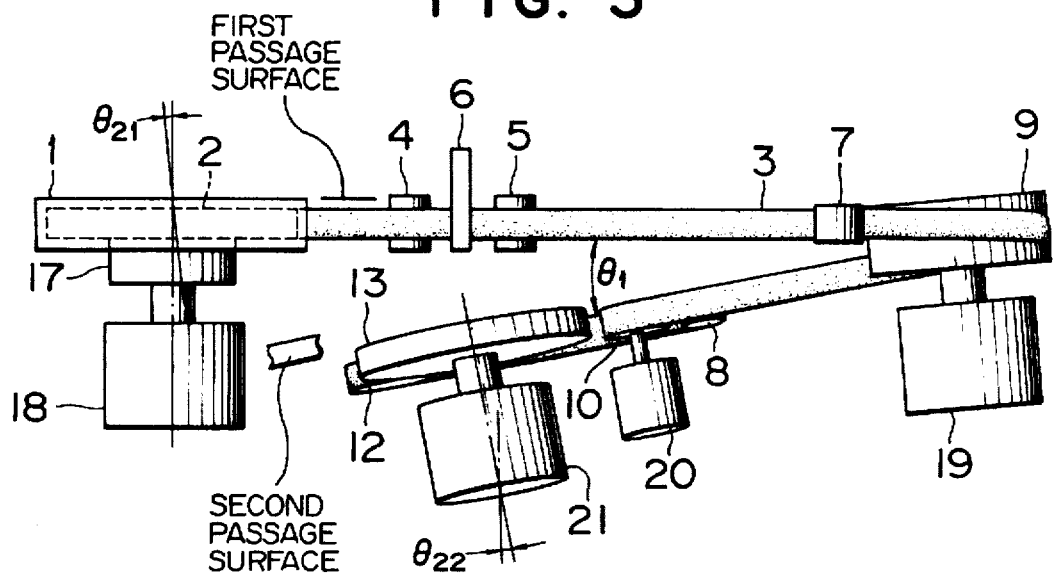
FIG. 3 is a side elevational view which illustrates the configuration of the elements of the tape path portion of the apparatus shown in FIG. 1 and a state where the magnetic tape is loaded.

The angle made by the two passage surfaces is created by diagonal winding, that is, helical winding of a magnetic tape 3 around the outer surface of the rotative drum 9 in a rotative drum portion in which a magnetic head for recording and reproducing information to and from the magnetic tape 3 while rotating is included. As shown in FIG. 3, which is a side elevational view of only elements forming the tape path shown in FIG. 1, assuming that the angle made by the first passage surface and the second surface is θ1, θ1 is the sum of angle θ21 and θ22 made by a direction perpendicular to each passage surface and the central axis of rotation of the rotation drum.

Figure 2:
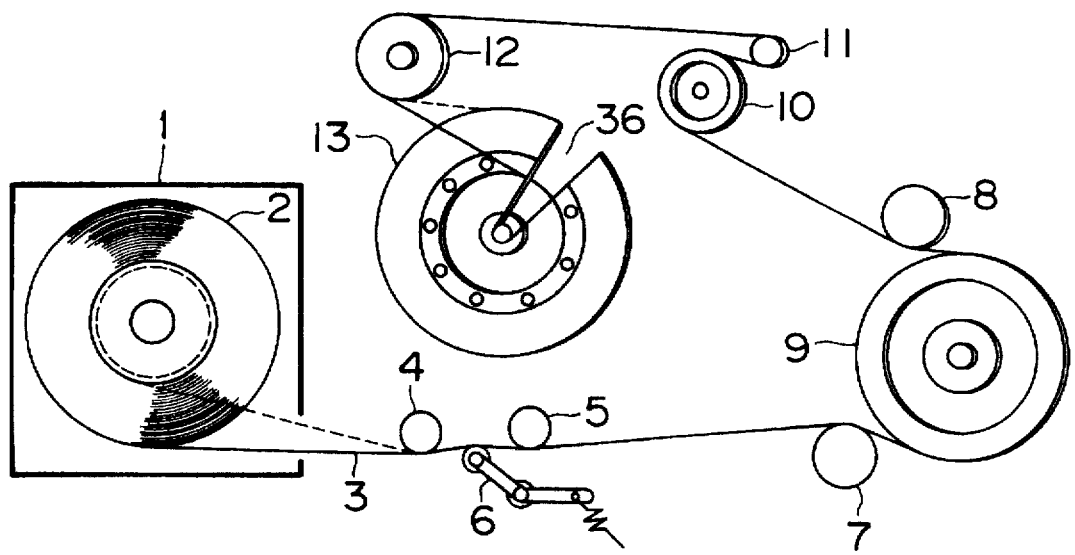
FIG. 2 is a plan view which illustrates the configuration of the elements of the tape path portion of the apparatus shown in FIG. 1 and a state where the magnetic tape is loaded.

FIG. 2 is a plan view which illustrates the configuration of the elements forming the tape path portion of the magnetic recording and reproducing apparatus 100 shown in FIG. 1. It should be noted that the tape threading device is omitted from plan views, each of which illustrates the configuration of the elements forming the tape portion.

Referring to FIGS. 1, 2 and 3, the structure of the tape path portion will now be described.

The cartridge 1 including the supply reel 2, around which the magnetic tape 3 is wound, is set to a supply reel frame 17, the cartridge 1 then supplying the magnetic tape 3 to the magnetic recording and reproducing apparatus 100.

The magnetic tape 3 passes through guide rollers 4 and 5 and the drum inlet guide 7, the magnetic tape 3 being then wound around the rotative drum 9. The magnetic tape 3 arranged from the cartridge 1 to the drum inlet guide 7 is placed on the foregoing same passage surface. The foregoing passage surface is the first passage surface.

The magnetic tape 3 is diagonally wound around the rotative drum 9 and pulled out of the rotative drum 9 in a direction inclined with respect to the first passage surface. The magnetic tape 3 pulled out of the rotative drum 9 passes through the drum outlet guide 8, a vacuum capstan 10, a guide roller 11 and a guide roller 12, the magnetic tape 3 being the wound around the take-up reel 13. The same passage surface on which the magnetic tape 3 is moved during the foregoing process is the second passage surface.

In order to pull the magnetic tape 3 out of the cartridge 1 to wind it around the take-up reel 13, an exclusive tape threading device adapted to the tape path of the magnetic recording and reproducing apparatus must be used. The tape threading device, as shown in FIG. 1, comprises a threading arm 30 composed of a link mechanism, a flat cam member 33 having a cam groove 34 formed to be engaged with a portion of the threading arm 30, an end-surface cam 32 for supporting a portion of the threading arm 30 at the central portion of the cam member 30 to set the vertical position of the threading arm 30, a threading pin 31 disposed at the leading portion of the threading arm 30 and hooking the leading block positioned at the leading portion of the magnetic tape 3, and a threading-arm drive motor 35.

The threading device is operated such that the threading pin 31 disposed at the leading portion of the threading arm 30 is first engaged with a leading block 42 fastened to the end of the magnetic tape 3 accommodated in the cartridge 1. Then, the threading-arm drive motor 35 is rotated to rotate the threading arm 30 of the link mechanism in a direction in which the magnetic tape 3 is pulled out of the cartridge 1. As a result of the rotation, the threading arm 30 is moved to the first and second passage surfaces in accordance with the shape of the cam groove 34 formed in the flat cam member 33, followed by moving perpendicular to each passage surface in accordance with the shape of the end-surface cam 32. Finally, the leading block is inserted into a slot 36 formed in a portion of the circumferential direction of the take-up reel 13 so that operation for threading the magnetic tape to the magnetic recording and reproducing apparatus is completed. When the magnetic tape 3 is returned from the take-up reel 13 to the cartridge 1, the process of the foregoing threading operation may be inverted.

Since the mechanism of the threading device will be described later, the description about the detailed structure is omitted here.

A tension sensor 6 is so disposed between the guide roller 4 and the guide roller 5 on the first passage surface to press the magnetic tape 3 to the two guide rollers 4 and 5 in order to detect the tension of the magnetic tape 3. Although the tension sensor 6 is disposed between the supply reel to the drum, another tension sensor may be disposed between the drum and the take-up reel to use the average value of the two measured values.

The vacuum capstan 10 is disposed to face the second passage surface to drive the magnetic tape 3. This embodiment is arranged so that the drive of the supply reel and that of the take-up reel are caused to follow the drive of the vacuum capstan 10 to make the tension detected by the tension sensor 6 to be constant.

The inlet guide 7 and the outlet guide 8 are disposed on the inlet side and the outlet side of the rotative drum 9 to locate the tape wound around the rotative drum 9. The inlet guide 7 and the outlet guide 8 are, by a drum-inlet-guide guiding member 22 and a drum-outlet-guide guiding member 23, guided in directions designated by arrows A and A' shown in FIG. 4 to be capable of moving away from the magnetic tape 3.

Also the tension sensor 6 is able to move away from the magnetic tape. By moving the guide roller 11 in a direction designated by arrow C shown in FIG. 4, the contact of the vacuum capstan 10 with the magnetic tape 3 can be prevented.

As a result, the following operations can be performed easily: a high speed tape moving operation in which the inlet guide 7, the outlet guide 8, the guide roller 11 and the tension sensor 6 are moved away from the magnetic tape 3 to prevent the contact and in which recording and reproducing of information to and from the magnetic tape 3 does not need to be performed; an operation in which the magnetic tape 3 pulled out of the cartridge 1 is set to the take-up reel 13 by way of the rotative drum 9 and the guide roller 12; and an operation in which the magnetic tape 3 is taken up from the take-up reel 13 to the cartridge 1.

In a threading operation mode in which the magnetic tape 3 is arranged from the cartridge 1 to the take-up reel 13, the inlet guide 7, the outlet guide 8, the guide roller 11 and the tension sensor 6 are moved to the position away from the magnetic tape 3.

In the loading operation mode, the moved inlet guide 7 and the outlet guide 8 are moved toward the rotative drum 9. Further, the guide roller 11 is rotated around the vacuum capstan 10 to wind the magnetic tape 3 around the vacuum capstan 10. In addition, the tension sensor 6 is disposed to the center position between the two guides while pressing the magnetic tape 3 to the guide roller 4 and the guide roller 5 as shown in FIG. 2.

In the foregoing loading operation, the guide roller 11 and the tension sensor 6 are moved perpendicularly to the surface of the magnetic tape 3 and in contact with the same. The inlet guide 7 and the outlet guide 8 for winding the magnetic tape 3 around the drum 9 presses the magnetic tape 3 against the drum 9 while sliding in the widthwise direction of the magnetic tape 3.

Figure 4:
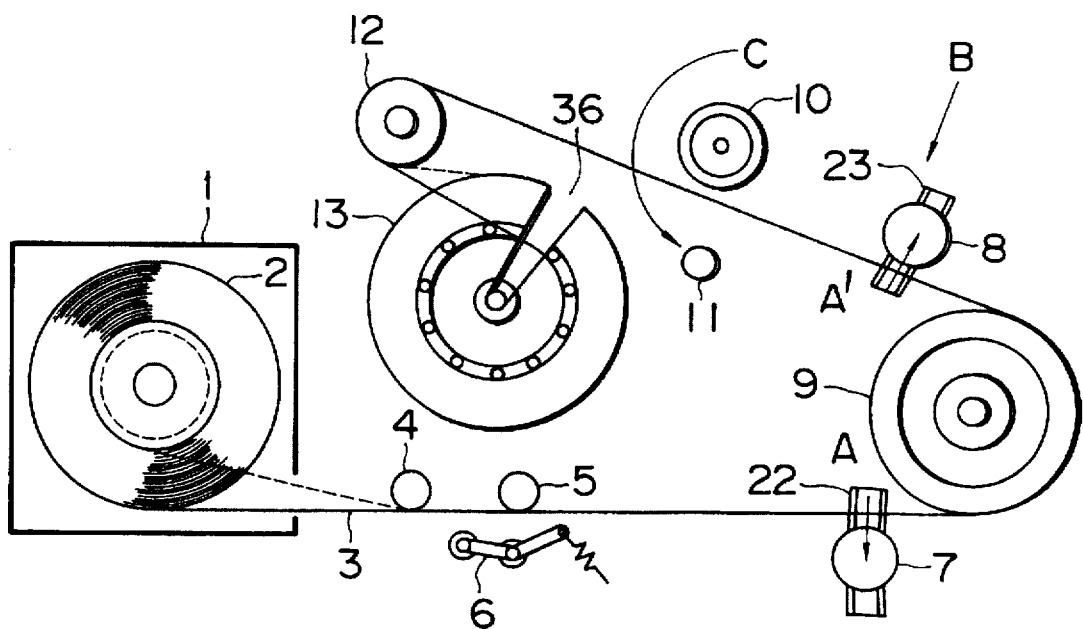
FIG. 4 is a plan view which illustrates a state where threading has been completed.
Figure 5:
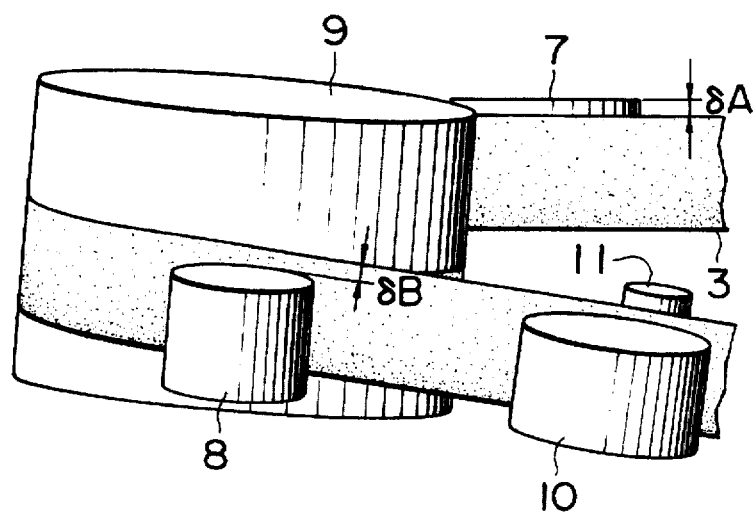
FIG. 5 is a perspective view which illustrates a state where the magnetic tape is set to a rotative drum when viewed in a direction designated by arrow B shown in FIG. 4.

FIG. 5 illustrates the positional relationship among the inlet guide 7, the outlet guide 8 and the magnetic tape 3 when viewed in a direction designated by arrow B shown in FIG. 4 in a state where the magnetic tape 3 is loaded on to the rotative drum 9.

In the state shown in FIG. 4 where the magnetic tape 3 is threaded to the magnetic recording and reproducing apparatus, the magnetic tape 3 wound around the rotative drum 9 is moved away from the rotative drum 9 such that the inlet side of the magnetic tape 3, that is, the side facing the first passage surface is separated from the rotative drum 9 at a drum tangent position which connects the tape contact surface of the guide roller 5 with a straight line. On the other hand, the outlet side of the magnetic tape 3, that is, the side facing the second passage surface is separated from the rotative drum 9 at a drum tangent position which is connected the tape contact surface of the guide roller 12 with a straight line. The inlet guide 7 and the outlet guide 8 are, as shown in FIG. 2, positioned adjacent to the guide roller 5 and the guide roller 12 with respect to the drum 9. In the loading operation mode, the passing surface of the magnetic tape 3 is inclined with respect to a surface perpendicular to the center shaft of the rotation of the drum 9. Therefore, the widthwise position of the magnetic tape 3 is changed after restriction has been performed as compared with the state where the restriction is not performed. That is, if the two guides 7 and 8 are, as shown in FIG. 5, moved while maintaining the widthwise position of the magnetic tape 3, the magnetic tape 3 is shifted by $\delta_A$ and $\delta_B$ from the two guides 7 and 8.

Figure 6:
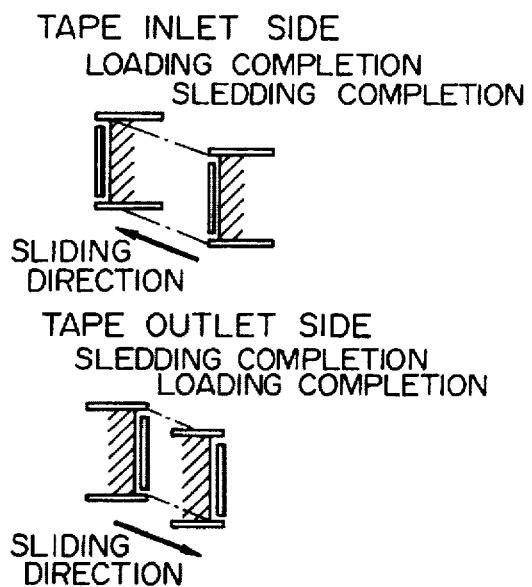
FIG. 6 is an explanatory view of the operation of a guide.

Accordingly, the two guides 7 and 8 are shifted in the direction of the width of the magnetic tape 3 while guiding the magnetic tape 3. The shifting directions are, as shown in FIG. 6, made opposite between the inlet guide 7 and the outlet guide 8. Each passage surface created due to the foregoing shifting operation is slightly deviated from the passage surface formed at the time of threading the magnetic tape 3 from the drum to the supply reel and the take-up reel. While considering the amount of deviation, the structure of each element is adapted to the passage surface of the magnetic tape at the time of the loading operation.

The inlet guide 7 and the outlet guide 8 may be air guides structured to jet out air from their guide surfaces. Although only the tension sensor 6 according to this embodiment is disposed adjacent to the supply cartridge, another tension sensor may be disposed adjacent to the take-up reel to detect the tension. In this case, the difference in tension depending upon the position can be eliminated, resulting in that the supply and winding of the magnetic tape can be stabilized.

Figure 7:
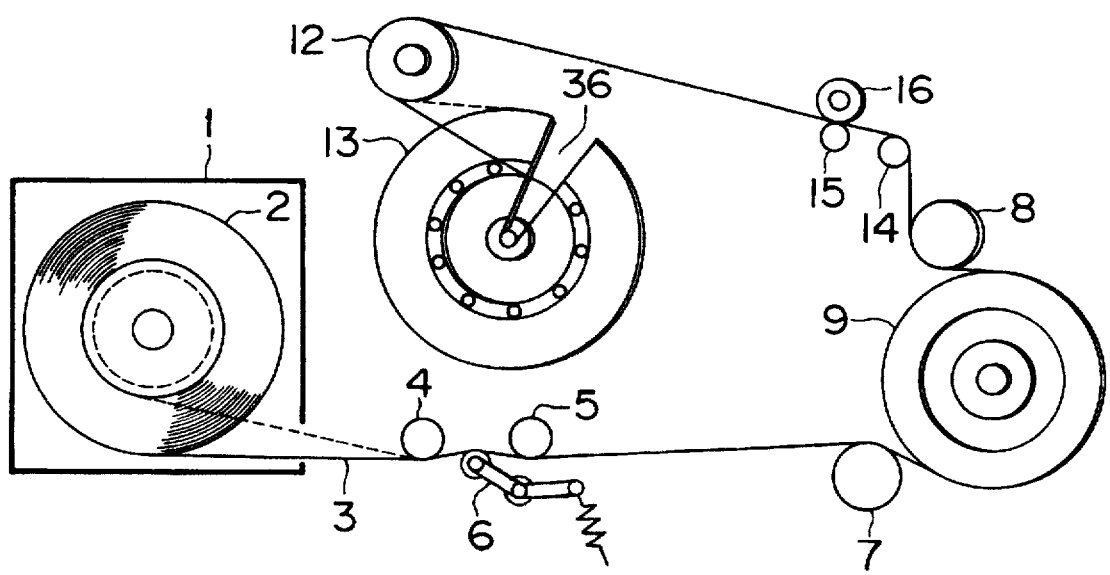
FIG. 7 is a plan view which illustrates the configuration of the elements of the tape path portion of a magnetic recording and reproducing apparatus according to another embodiment of the present invention and a state where the magnetic tape is loaded.

A tape path portion of a magnetic recording and reproducing apparatus 100 according to another embodiment of the present invention is shown in FIG. 7. The description will be made about only different portions from the foregoing embodiment, the same or similar elements are given the same reference numerals and their descriptions are omitted here.

FIG. 7 illustrates an arrangement in which the vacuum capstan 10 of the magnetic recording and reproducing apparatus according to the first embodiment is replaced by a capstan roller 15 and a pinch roller 16. A capstan motor 8 omitted from illustration) for driving the capstan roller 15 is disposed coaxially with the capstan roller 15, the capstan motor having an outer diameter larger than that of the capstan roller 15. Therefore, disposition of the capstan roller 15 adjacent to the take-up reel 13 is inhibited because a motor (omitted from illustration) for rotating the take-up reel 13 and the capstan motor interferes with each other.

This embodiment is so arranged that the magnetic tape 3 is enabled to pass a position away from the take-up reel 13 by disposing a guide roller 14 adjacent to the outlet guide 8. The position of the guide roller 14 is so determined that the capstan motor and the take-up motor does not interfere with each other while causing the magnetic tape 3 to be positioned away from the capstan roller 15 in a state where the pinch roller 16 is not in contact with the capstan roller 15.

As a result, the operation for passing the magnetic tape 3, that is, passing of the magnetic tape 3 from the supply reel 2 and the take-up reel 13 can be performed while preventing contact of the magnetic tape 3 with the capstan roller 15.

Figure 8:
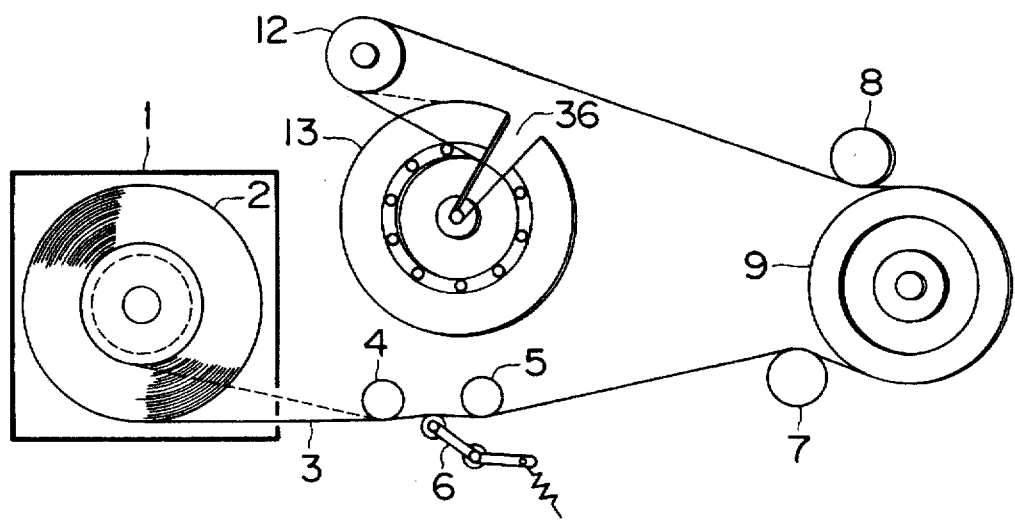
FIG. 8 is a plan view which illustrates the configuration of the elements of the tape path portion of a magnetic recording and reproducing apparatus according to another embodiment of the present invention and a state where the magnetic tape is loaded.

A tape path portion of a magnetic recording and reproducing apparatus according to another embodiment of the present invention is shown in FIG. 8.

FIG. 8 illustrates a structure so arranged that the pinch roller 16, the capstan roller 15 and the guide roller 14 are omitted from the tape path according to the foregoing second embodiment. The structure according to this embodiment relates a method of directly passing the magnetic tape 3 by the supply reel 2 and the take-up reel 13.

The tension of the magnetic tape 3 is detected by the tension sensor 6 and the detected tension is made to be always constant by supplying the magnetic tape 3 from the supply reel 2 and by performing control in such a manner that the speed, at which the take-up reel 13 winds the magnetic tape 3, is synchronized with the speed, at which the magnetic tape 3 is supplied. As a result of the control thus-performed, the magnetic tape 3 can be supplied directly from the supply reel 2 to the take-up reel 13 by only the drives of the two reels 2 and 13 in a state where the capstan roller 15 is omitted.

According to this embodiment, the size of the apparatus can be reduced.

Figure 9:
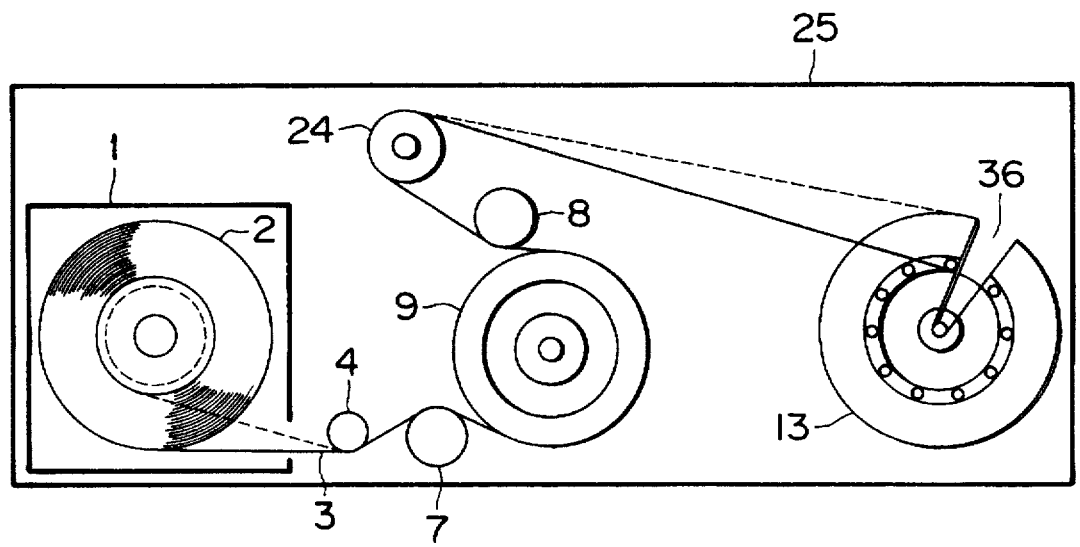
FIG. 9 is a plan view which illustrates the configuration of the elements of the tape path portion of a magnetic recording and reproducing apparatus according to another embodiment of the present invention and a state where the magnetic tape is loaded.

A tape path portion of magnetic recording and reproducing apparatus according to another embodiment is shown in FIG. 9.

FIG. 9 illustrates the magnetic recording and reproducing apparatus in which the cartridge 1, the drum 9 and the take-up reel 13 are disposed to form substantially a straight line. In this embodiment, the first passage surface from the cartridge 1 to the drum inlet guide 7 and the second passage surface from the drum outlet guide 8 to the take-up reel 13 make a predetermined angle similarly to the foregoing embodiment. In this embodiment, a tension sensor 24 is disposed adjacent to the take-up reel 13, the tension sensor 24 also serving as a guide roller to change the direction from the drum 9 toward the take-up reel 13. It should be noted that a dashed line shown in FIG. 9 designated the position of the magnetic tape 3 in a state where the magnetic tape 3 is wound around the take-up reel 13.

As a result of structure according to this embodiment in which the cartridge 1, the rotative drum 9 and the take-up reel 13 are disposed in this sequential order, the inclined shaft of the take-up reel can be disposed outside. Therefore, the interference between the drum motor and the take-up reel motor can be prevented and, accordingly, the width of the apparatus can be reduced. Therefore, the size of the apparatus can be reduced.

Although the structure according to this embodiment is so arranged that the motors for rotating supply reel, the take-up reel, the rotative head and the capstan roller are disposed coaxially, the foregoing elements may be rotated from another positions by making use of belts or the like. Further, the portion for driving the tape guides 7 and 8 may be a drive portion comprising a linear motion mechanism or a portion comprising a rotational motion mechanism is place of the mechanism having the guide rail as shown in FIG. 4.

Figure 10:
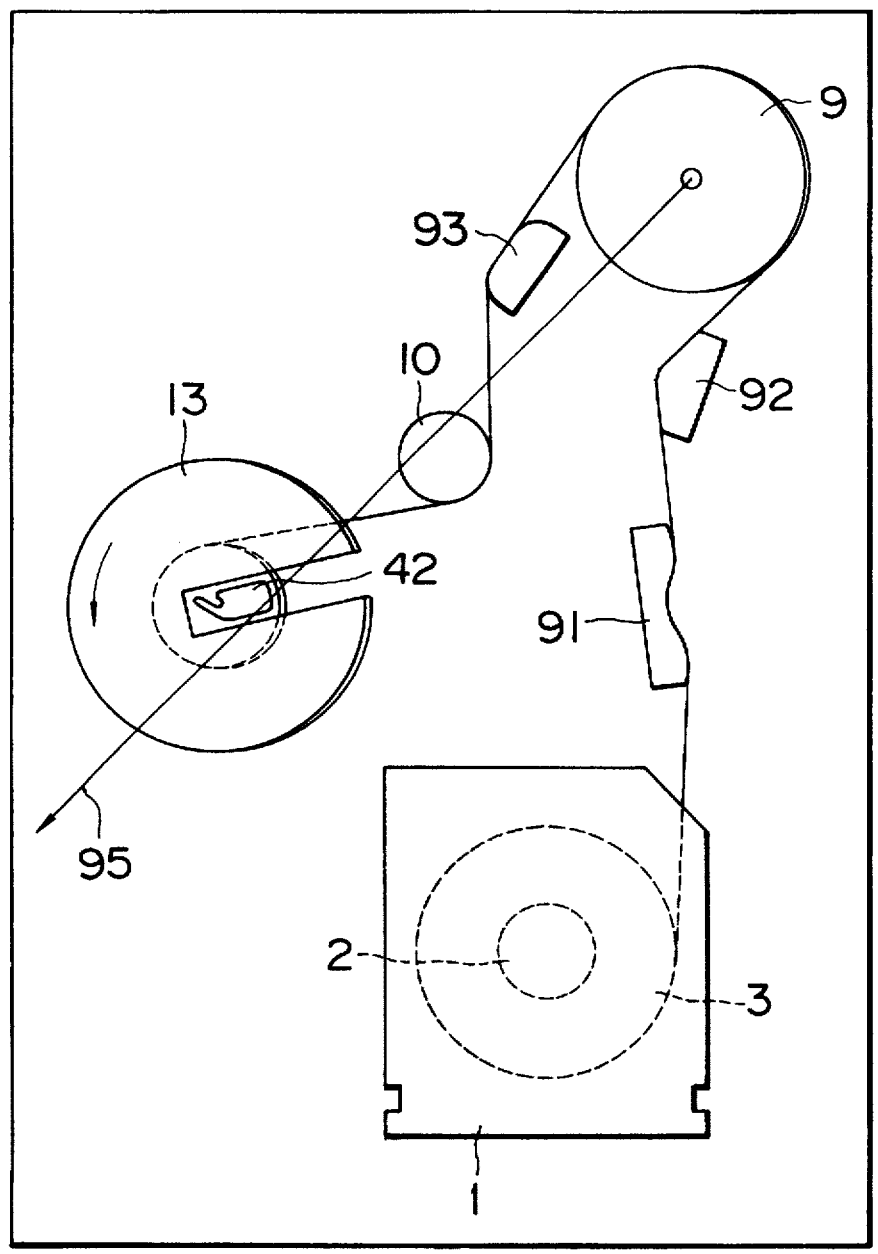
FIG. 10 is a plan view which illustrates a magnetic recording and reproducing apparatus according to another embodiment of the present invention.

FIG. 10 is a plan view which illustrates a magnetic recording and reproducing apparatus according to another embodiment of the present invention.

Referring to FIG. 10, reference numeral 1 represents a cartridge, 2 represents a supply reel disposed in the cartridge 1, 42 represents a leading block and 3 represents a magnetic tape. The magnetic tape 3 has, an end thereof, a leading block 42, the magnetic tape 3 being accommodated in the cartridge 1 while being wound around the supply reel 2. Reference numeral 91 represents a buffer, 92 represents an air guide, and 9 represents a rotative drum. The buffer 91 and the air guide 92 are disposed between the drum 9 and the cartridge 1, the air guide 92 having a tape contact surface formed into a circular arc shape. Reference numeral 93 represents an air guide, 10 represents a vacuum capstan, 13 represents a take-up reel, the air guide 93 and the vacuum capstan 10 being disposed between the rotative drum 9 and the take-up reel 13. The surface of the air guide 93, on which it comes in contact with the magnetic tape 3, is formed into a circular arc shape. Further, the take-up reel 13 has a cut portion for receiving the leading block 42.

The operation of the magnetic tape apparatus according to this embodiment will now be described. First, the leading block 42 is pulled out of the cartridge 1, the leading block 42 being then moved along the threading path shown in FIG. 2, followed by being accommodated around the take-up reel 13. Then, the take-up reel 13 winds up the magnetic tape 3 by a predetermined quantity so that the magnetic tape 3 is guided to the buffer 91 and the air guide 92. Then, the magnetic tape 3 is moved along a spiral lead formed on the rotative drum 9 to be wound around the air guide 93 and the vacuum capstan 10. Thus, threading is completed. Each of the air guides 92 and 93, around which the magnetic tape 3 is wound at an angle of 90° or less, has a plurality of small apertures for blowing out compressed air to the tape sliding surface. As a result, an air film is formed between the magnetic tape 3 and the tape sliding surface of the guide to cause the magnetic tape 3 to float from the air guide. As a result, the magnetic tape 3 is protected from damage due to sliding taken place between the air guides 92, 93 and the magnetic tape 3. Further, the vacuum capstan 10 is so controlled as to be rotated stably by a capstan motor (omitted from illustration). As a result, the magnetic tape 3 is sucked to generate driving force so that the magnetic tape 3 is moved.

Since the vacuum capstan 10 comes in contact with the non-magnetic surface of the magnetic tape 3, the magnetic surface of the magnetic tape 3 is not damaged at the time of the operation. As a result, a reliable apparatus can be provided. The buffer 91 is composed of a portion for sucking the magnetic tape 3 and a portion for discharging compressed air, the buffer 91 serving as an apparatus for buffering tension changes. This embodiment is so arranged that a straight line 95 connecting the center of a non-tape-winding portion of the rotative drum 9 and the central axis of the rotation of the rotative drum 9 and a line segment formed by the rear side of the cartridge 1 intersect each other.

Figure 11:
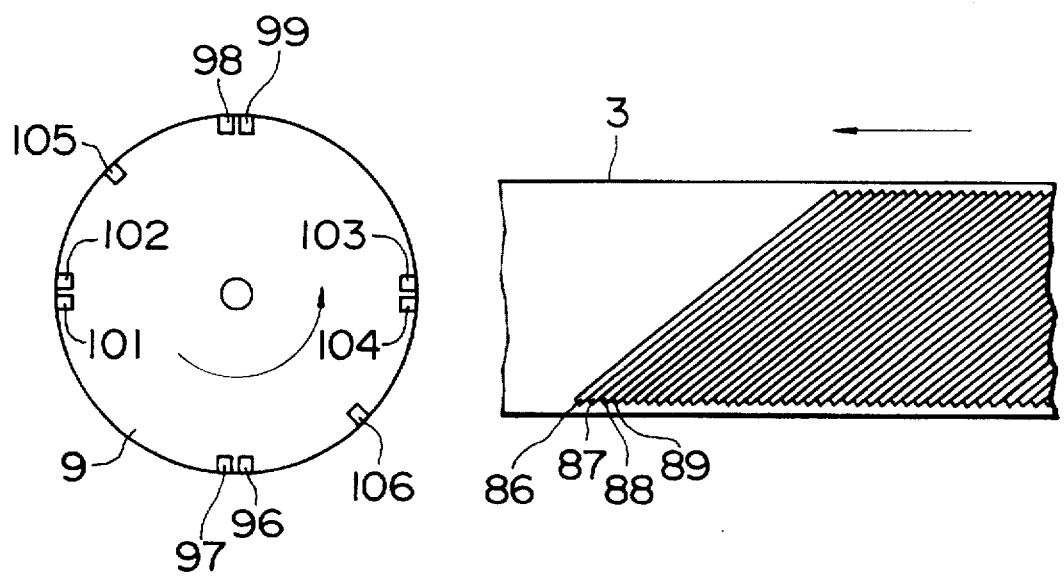
FIG. 11 is a plan view which illustrates the disposition of the magnetic heads of the drum and a tape track pattern.

The configuration and the structure of the magnetic head of the rotative head and the recorded track pattern will now be described. Referring to FIG. 11, reference numerals 96, 97, 98 and 99 represent recording magnetic heads, 101, 102, 103 and 104 are reproducing magnetic heads, and 105 and 106 represents deleting heads. The rotative drum 9 is rotated in a direction designated by an arrow so that the magnetic tape 3 is moved in a direction designated by another arrow. The recording magnetic heads 96 and 97 record tracks 86 and 87, and then the recording magnetic heads 98 and 99 record tracks 88 and 89.

Figure 12:
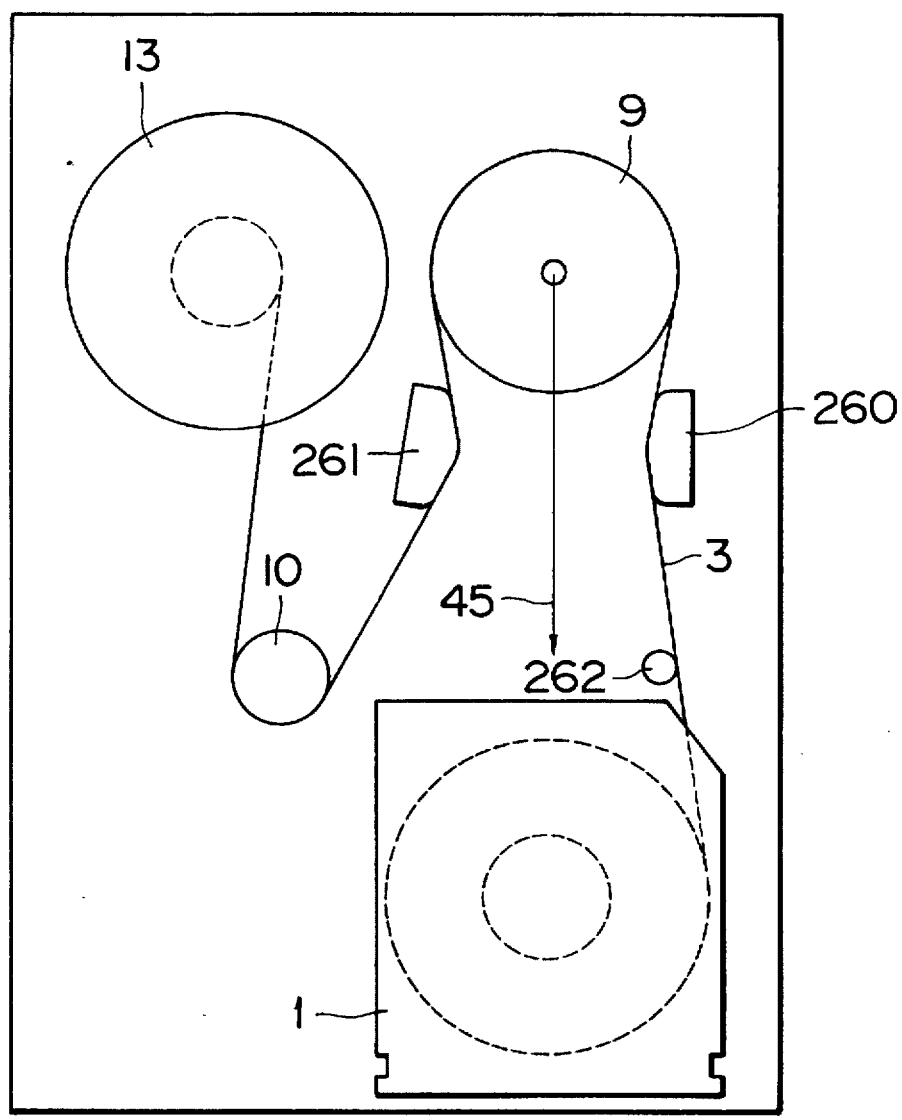
FIG. 12 is a plan view which illustrates a magnetic recording and reproducing apparatus according to another embodiment of the present invention.
Figure 13:
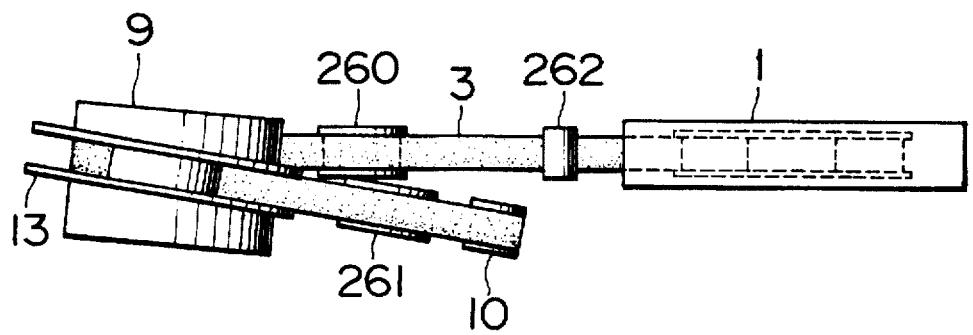
FIG. 13 is a side elevational view which illustrates a state where the magnetic tape is loaded into the apparatus shown in FIG. 12.

FIG. 12 is a plan view which illustrates a magnetic tape apparatus according to another embodiment of the present invention. FIG. 13 is a side elevational view which illustrates the magnetic tape apparatus shown in FIG. 12. This embodiment is arranged such that the take-up reel 13 is disposed on the side of the rotative drum 9 and the magnetic tape 3 is driven by the vacuum capstan 10. Referring to FIG. 12, reference numerals 260 and 261 represent air guides. A magnetic tape 10 pulled out of the cartridge 1 is guided by a guide 262 and the air guide 260 as to be wound around the rotative drum 9. The magnetic tape 3 discharged from the rotative drum 9 passes through the vacuum capstan 10 while being guided by the air guide 261, and then wound around the take-up reel 13 by way of the vacuum capstan 10. Since the vacuum capstan 10 comes in contact with the non-magnetic surface of the magnetic tape 3, the magnetic surface of the magnetic tape 3 is not damaged at the time of the operation. Therefore, a reliable apparatus can be provided. Since the embodiment is so structured that the magnetic tape 3 is wound around the vacuum capstan 10 by abut 180° as shown in FIG. 13, the direction, in which the magnetic tape 3 is moved, can be changed from downward movement to the upward movement. As a result of the foregoing structure, the deviation of the height of the magnetic tape 3 with respect to the cartridge 1 can be reduced. Therefore, the thickness of the mechanism can be thinned.

Figure 14:
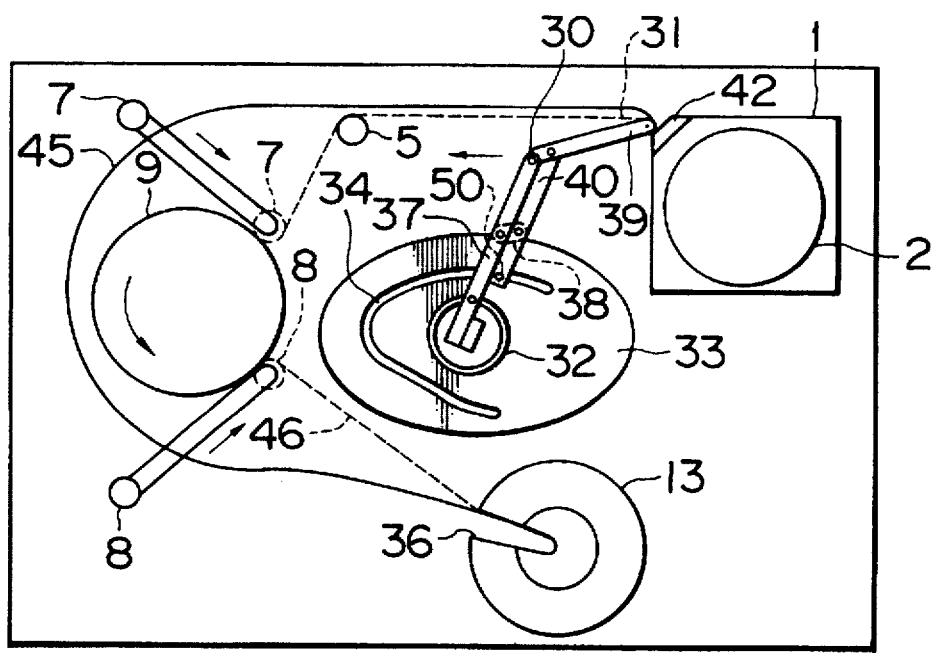
FIG. 14 is a plan view which illustrates the configuration of the elements of the tape path portion and a threading device of a magnetic recording and reproducing apparatus according to another embodiment of the present invention.

FIG. 14 is a plan view which illustrates a magnetic recording and reproducing apparatus according to another embodiment of the present invention. FIG. 14 illustrates the configuration of the cartridge 1, the rotative drum 9, a take-up reel 13 and the tape threading device. The magnetic recording and reproducing apparatus according to this embodiment is arranged that the passage surface from the cartridge 1 to the rotative drum 9 and the passage surface from the rotative drum 9 to the take-up reel 13 are inclined with respect to each other similarly to the foregoing embodiment.

The tape threading device is disposed at substantially the central portion among the cartridge 1, the rotative drum 9 and the take-up reel 13.

The guide roller 5 is disposed outside a line establishing the connection between the leading block 7 disposed at the leading portion of the magnetic tape 3 accommodated in the cartridge and the portion of the rotative drum 9 in which it comes in contact with the magnetic tape 3. That is, the guide roller 5 is shifted in a direction opposing the take-up reel 13. Further, the drum inlet guide 7 and the drum outlet guide 8 respectively are disposed on the inlet side and the outlet side of the rotative drum 9.

The magnetic tape 3 is moved by directly rotating the supply reel 2 and the take-up reel 13.

The threading arm 30, as described above, causes the leading block 42 to be moved along the tape passage formed three-dimensionally in such a manner that the locus 45 of the planar movement of the leading block 42 as shown in FIG. 14 and a movement in the direction of the height are combined. The locus 45 of the planar movement is realized by a panto-arm mechanism composed of the cam groove 34 formed in the cam member 33 and the threading arm 30. The movement in the direction of the height is realized by the end-surface cam 32 of the cam member 33.

After the threading arm 30 has caused the magnetic tape 3 to be pulled out of the cartridge 1 and to move the magnetic tape 3 through a position adjacent to the rotative drum 9, the tape guide members 7 and 8 are moved from positions designated by solid lines to positions designated by dashed lines. Finally, a tape path 46 designated by a dashed line is formed.

Figure 15:
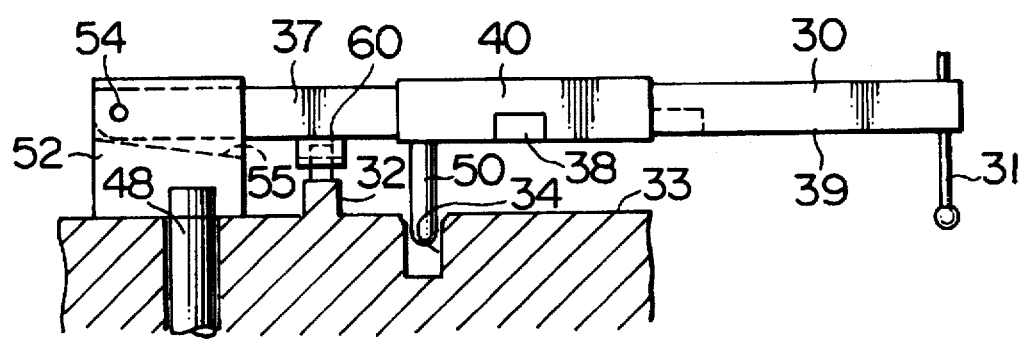
FIG. 15 is a side elevational view which illustrates the threading device shown in FIG. 14.

The operational mechanism of the threading arm 30 will now be described with reference to FIG. 15, which is a side elevational view that illustrates the relationship among the threading arm 30, the cam member 33 and the end-surface cam 32. The threading arm 30 receives the rotational force of the arm drive motor 35 by way of the shaft 48 so that the threading arm 30 is rotated. An arm central portion 52 and a main link member 37 are connected to each other by a pin 54. The surface of the arm central portion 52 which comes in contact with the main link member 37 is inclined while forming a gap between the arm central portion 52 and the main link member 37. As a result, the main link member 37 is made rotative in the vertical direction. Follower link members 38, 39 and 40 are connected to corresponding link members by pin members (omitted from illustration) inserted vertically. As a result, the link members are connected to one another without freedom in the vertical direction, while the main link member 37 and the follower link members 38, 39 and 40 are integrally rotated in a vertical plane around the pin 54. A roller 60 disposed below the main link member 37 rolls on the end-surface cam 32 disposed on the cam member 33. The threading arm 30 is supported by two positions, that is, by the roller 60 and the pin 54. As a result, the vertical attitude of the threading arm 30 is determined by the height of the end-surface cam 32.

Although this embodiment is so arranged that the main link member 37 and the end-surface cam 32 are in contact with each other while interposing the roller 60, the roller 60 may be omitted if the frictional force between the main link member 37 and the end-surface cam 32 does not interrupt the rotation of the threading arm 30.

A portion of the leading portion of a. groove pin 50 connected to the follower link member 40 is inserted into the cam groove 34 to locate the follower link member 40 in the horizontal plane. The threading arm 30 forms the panto-arm mechanism as described above, and the state of the panto-arm mechanism is determined depending upon the position of the follower link member 40. Further, the attitude of the threading arm 430 is determined by the height of the end-surface cam 32. The arrangement must be so made that the groove pin 50 does not come in contact with the bottom surface of the cam groove 34.

Figure 16:
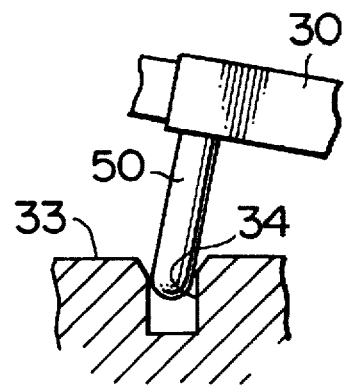
FIG. 16 is a partial enlarged view which illustrates the groove pin and a cam groove shown in FIG. 15.

FIG. 16 illustrates the positional relationship between the groove pin 50 an the cam groove 34. In accordance with the change of the attitude of the threading arm 30, the attitude of the groove pin 50 is inclined as shown in FIG. 16. The dimensions of the cam groove 34 must be determined while considering the inclination of the groove pin 50 shown in FIG. 16 in addition to the condition of the positional relationship between the groove pin 50 and the cam groove 34.

The attitude change of the threading arm 30 causes the threading pin 31 connected to the threading arm 30 to be inclined. Depending upon the state of the connections established between the threading pin 31 and the leading block 42, the inclination of the threading pin 31 restricts the leading block 32 to an inclined attitude. The inclination of the leading block 7 interrupts the introduction of the leading block 7 into a slot 36 in the take-up reel 13 at the final stage of the loading operation. In order to prevent this, the leading portion of the threading pin 31 is formed into spherical and the thickness of the threading pin 31 except for the leading portion is thinned as shown in FIG. 15. As a result, the attitude of the threading pin 31 does not affect the attitude of the leading block 42.

Figure 17:
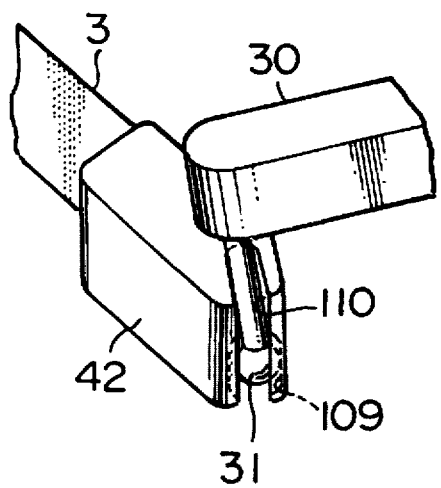
FIG. 17 is a perspective view which illustrates the relationship between the threading pin and the leading block of the apparatus shown in FIG. 14.

FIG. 17 illustrates the relationship between the threading pin 31 and the leading block 42 when the threading arm 30 has been inclined. The leading portion of the threading pin 31 is formed into the sphere having a diameter which is smaller than the size of a concave formed in the leading block 42. Also the thickness of the threading pin 31 is made to be smaller than the size of an opening 110 for accommodating the threading pin 31. As a result of the structure thus-arranged, the threading pin 31 and the leading block 42 can be connected to each other while allowing mutual attitude change.

Figure 18:
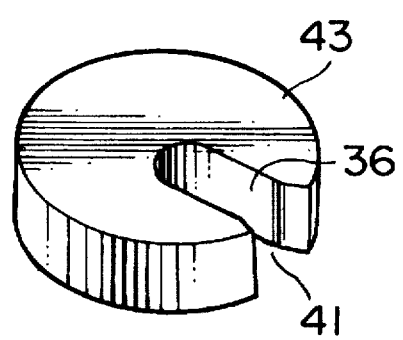
FIG. 18 is a perspective view which illustrates the hub of the central portion of a take-up reel.

FIG. 18 is a perspective view which illustrates a hub 43 disposed in the central portion of a take-up reel having a slot 36 into which the leading block 42 can be introduced even if the leading block 42 is inclined. A slot inlet portion 41 is made to be larger than the width of the leading block 42. The slot 36 is continuously formed also in the portion of the take-up reel 14 for winding the magnetic tape 3. As a result, the leading block 42 can be introduced into the slot 36 even if it is inclined. As the movement of the leading block 42 moves into deeper portions, the attitude of the leading block is modified due to the force applied from the wall surface of the slot 36. As a result, the overall body of the leading block 42 is received in the slot 36.

Figure 19:
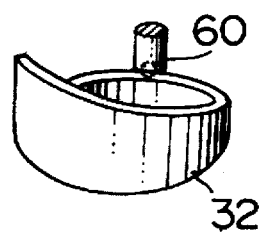
FIG. 19 is a perspective view which illustrates an end-surface cam of the threading device shown in FIG. 14.

FIG. 19 illustrates the shape of the end-surface cam 32. The end-surface cam 32 is formed into a shape obtained by a portion is cut from a cylindrical member. Since a roller 60 fastened to a rotative threading arm 30, the roller 60 is moved on a circle, the center of which is the rotational shaft of the threading arm 30. The height of the end-surface cam 32 can be determined arbitrarily so that the leading block 42 connected to the threading arm 30 passes through a proper position in the vertical direction. However, excessive height change must be prevented because it interrupts the rotation of the threading arm 30. Since the distance of the roller 60 from the rotational shaft of the threading arm 30 is changed due to the inclination of the threading arm 30, the upper surface of the end-surface cam 32 must have a width which is able to prevent the separation of the roller 60. A shape may be employed with which the upper surface of the end-surface cam 32 is inclined to correspond to the inclination of the threading arm 30.

Figure 20:
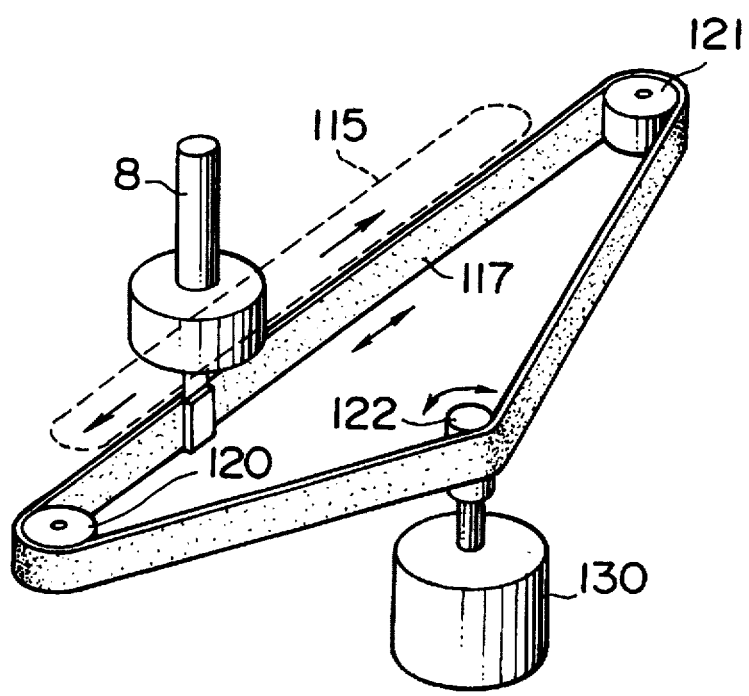
FIG. 20 is a perspective view which illustrates a movement mechanism for moving the tape guide of the apparatus shown in FIG. 14.

FIG. 20 illustrates an example of a movement mechanism for moving the tape guides 7 and 8 shown in FIG. 14. The tape guide 7 and 8 are, in their lower portions, moved through a guide groove 115 and fixed to a belt 117. The belt 117 is arranged by pulleys 120, 121 and 122 and driven by a belt drive motor 130.

Although this embodiment has the arrangement that the tape guide member is realized by making use of a belt, it may be realized by a known technology, such as a combination of a link mechanism and a gear or a liner motor. Although this embodiment has the arrangement that the movement is performed linearly, the guide groove may be formed into a curved shape and the roller may be disposed on the groove end surface 12 to move the tape guide member in a curved manner. Although this embodiment is so arranged that the tape guide member is moved while maintaining its attitude, the tape guide member may perform a complex movement while changing its attitude in order to protect the tape.

Figure 21:
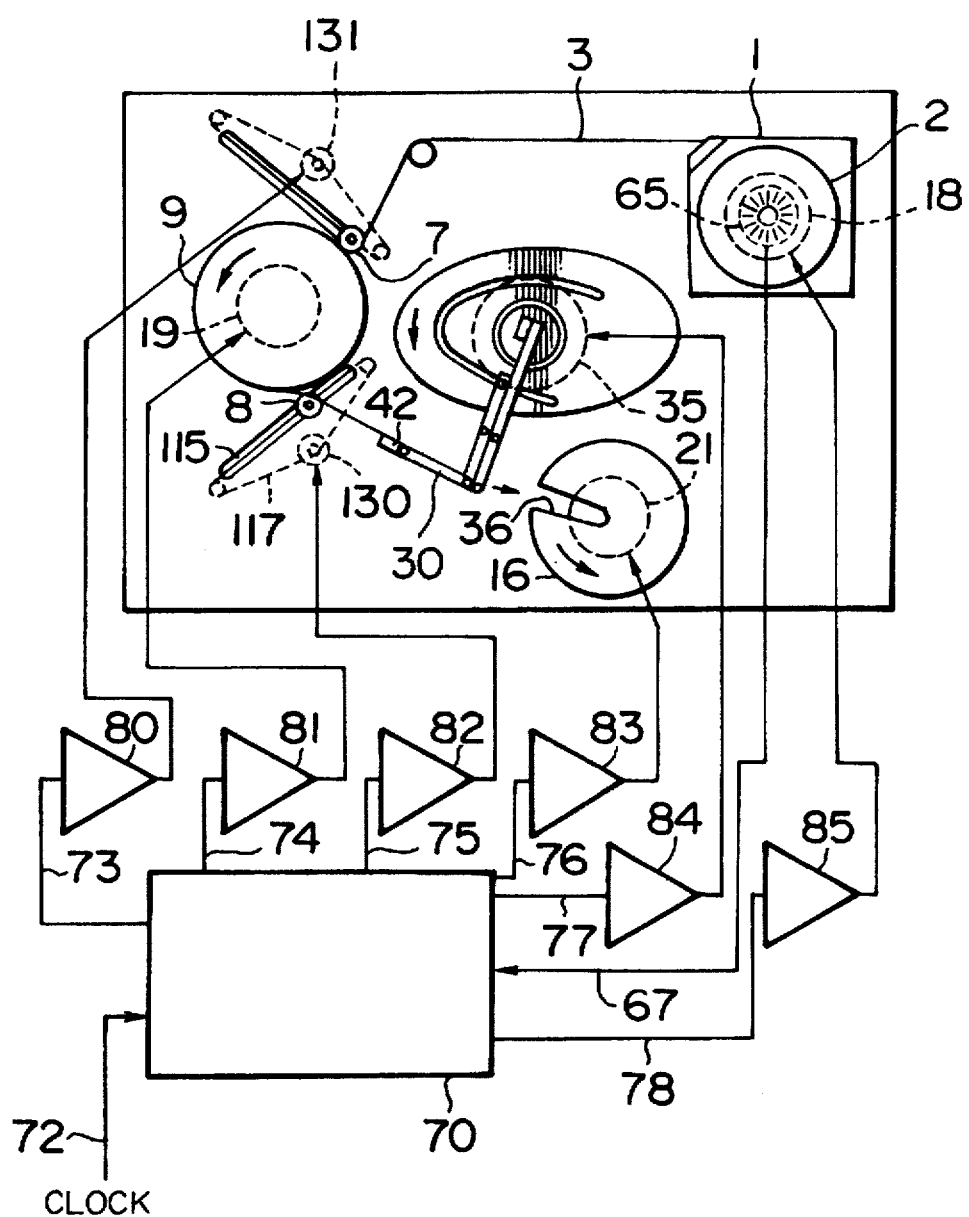
FIG. 21 is a structural explanatory view which illustrates control of the threading device and control for loading the magnetic tape to a predetermined position of the tape path of the apparatus shown in FIG. 14.

FIG. 21 is an explanatory view which illustrates control of the threading apparatus and control for loading the tape arranged by the threading apparatus to a predetermined position of the tape path. A reel drive motor 18 for driving the supply reel 2 in the cartridge 1 has an optical encoder 65 fastened thereto, the optical encoder 65 detecting the rotational angle of the reel 2. A signal denoting the rotational angle of the supply reel 2 detected by the optical encoder 65 is supplied to a controller 70. The controller 70 comprises a memory and a calculator and arranged to be operated by making use of a clock signal 72 supplied from a clock generator (omitted from illustration). Motor drive signals 73, 74, 75, 76, 77 and 78 transmitted from the controller 70 are respectively amplified by electricity amplifiers 80, 81, 82, 83, 84 and 85 to drive motors 131, 19, 130, 21, 35 and 18.

The operation of the threading device according to this embodiment will now be described in detail with reference to FIG. 21. The threading arm 30 has the threading pin 31 disposed at the leading portion thereof, the threading pin 31 being enabled to be connected to the leading block 42. Further, the drum inlet guide 7 and the outlet guide 8 are positioned farthest from the rotative drum 5 before the magnetic tape is loaded (see FIG. 14). When the cartridge 1 has been loaded, the pin 31 is connected to the leading block 42. The controller 70 so rotates the rotative drum 9 at a low speed as to protect the tape from damage for the purpose of preparing for the contact between the rotative drum 9 and the tape 3. Then, the controller 70 transmits a motor drive signal 77 to the arm drive motor 35 so that the threading arm 30 is so driven as to pull the leading block 42 and the tape 3. The controller 70 also transmit a motor drive signal 78 to the reel drive motor 18 to rotate the supply reel 2. As a result, the tension change of the tape 3 is prevented so that the tape 3 is protected.

By making use of the rotational angle signal 67 of the supply reel 2 supplied from the optical encoder 65 and data of the radius of the magnetic tape 3 wound around the supply reel 2, the data being previously supplied to the controller 70, the controller 70 calculates the lengths of the pulled-out tape 3 at predetermined time intervals. When a discrimination has been made by the controller 70 that the operation for threading the tape 3 to the passing system by a predetermined degree has been completed and that the leading block 42 has passed through a position adjacent to the drum inlet guide 7 in accordance with data of the length of the tape 3 pulled out, the controller 70 transmits the motor drive signal 73 to the motor 131 for driving the drum inlet guide 7. The motor drive is performed for a predetermined time so that the drum inlet guide 7 is moved to a position at which it wind the tape 3 around the rotative drum 9 as shown in FIG. 21. When a discrimination has been made that the leading block 42 has passed through a position adjacent to the drum outlet guide 8 in accordance with data about the length of the tape 3 which has been pulled out, the controller 70 transmit a motor drive signal 5 to the motor 130 for driving the drum outlet guide 8 to move the tape 3 to a position at which the tape 3 is wound around the rotative drum 9. Finally, the leading block 42 is properly positioned in the slot 36 of the take-up reel 13, and the controller 70 rotates the reel drive motor 21 to wind a portion of the tape around the take-up reel 13.

Although this embodiment has the arrangement that the controller 70 calculate the length of the tape 3 which has been pulled out and each operation is commenced when the length reached a predetermined length, timing of the commencement of each operation is previously stored in a memory included in the controller 70 and the clock signal 72 may be used to cause each operation to be commenced in accordance with the time passed from the commencement of the loading operation.

Figure 22:
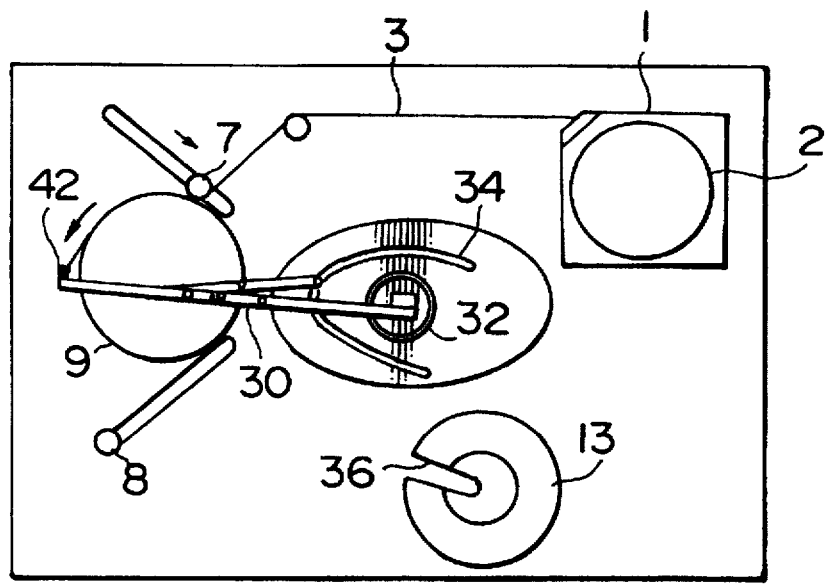
FIGS. 22 and 23 are explanatory views which illustrate the tape loading operation in the apparatus shown in FIG. 14.
Figure 23:
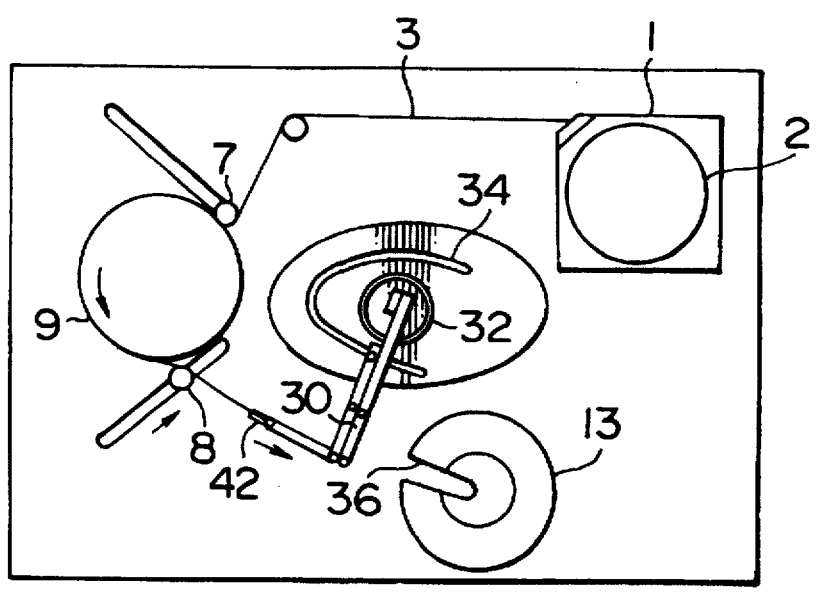

FIGS. 22 and 23 illustrate the intermediate states of the operation of the tape threading device. FIG. 22 illustrates a state where substantially the half of the tape 3 has been wound around the rotative drum 9 by the threading arm 30. In this state, the drum inlet guide 7 is being moved toward the rotative drum 9 and the drum outlet guide 8 is waiting at the waiting position.

FIG. 23 illustrates a state where the magnetic tape 3 has been wound around the rotative drum 9 and it is being introduced into the slot 36 of the take-up reel 13. The drum inlet guide 7 is stopped adjacently to the rotative drum 9, while the drum outlet guide 8 is being moved to press the magnetic tape 3.

Figure 24:
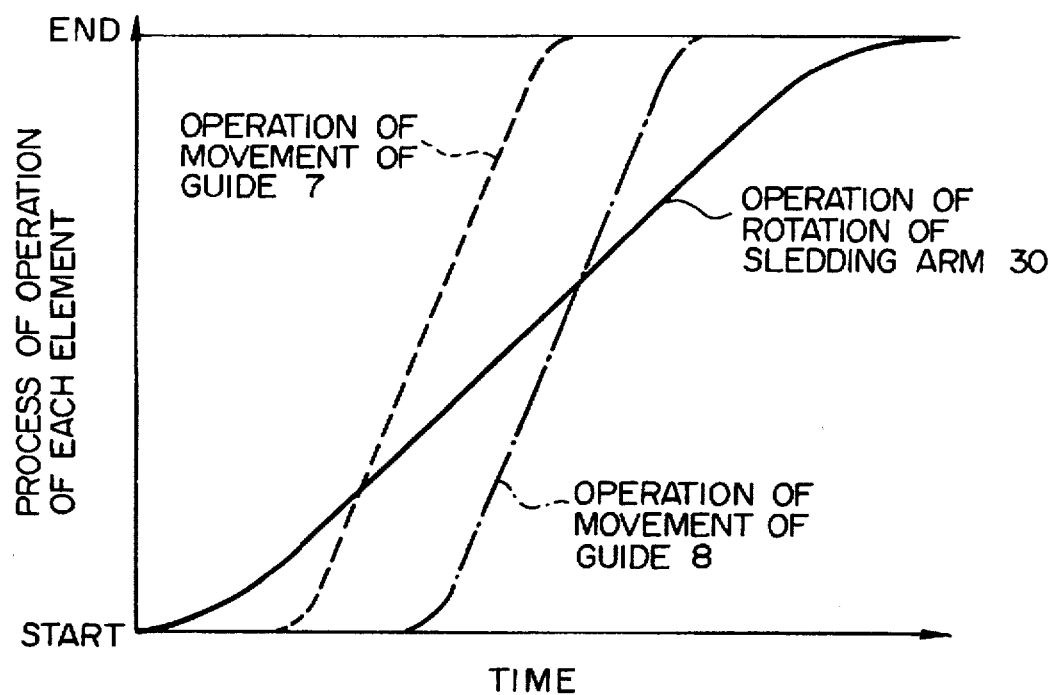
FIG. 24 is a explanatory view which illustrates the operational process of the threading arm and the tape guide.

FIG. 24 is a graph which illustrates the timing of commencements and completions of the rotational operation of the threading arm 30 and the moving operations of the drum inlet guide 7 and the drum outlet guide 8. Although each guide is operated in a shorter time as compared with the operation time of the threading arm 30, the two guides may be operated for a longer time for the purpose of protecting the magnetic tape. The operation speed of each member may be changed at an intermediate time.

The operation of loading the tape, which has been sledded by the tape threading device according to this embodiment is performed as described above. In this case, the operation for rewinding the tape 3 to the cartridge, that is, the unloading operation is performed by inverting the loading operation. Therefore, the rotation of the threading arm 30 to be performed at the time of the unloading operation and the moving process of the two guides are performed such that the axis of ordinate of FIG. 24 is inverted.

Figure 25:
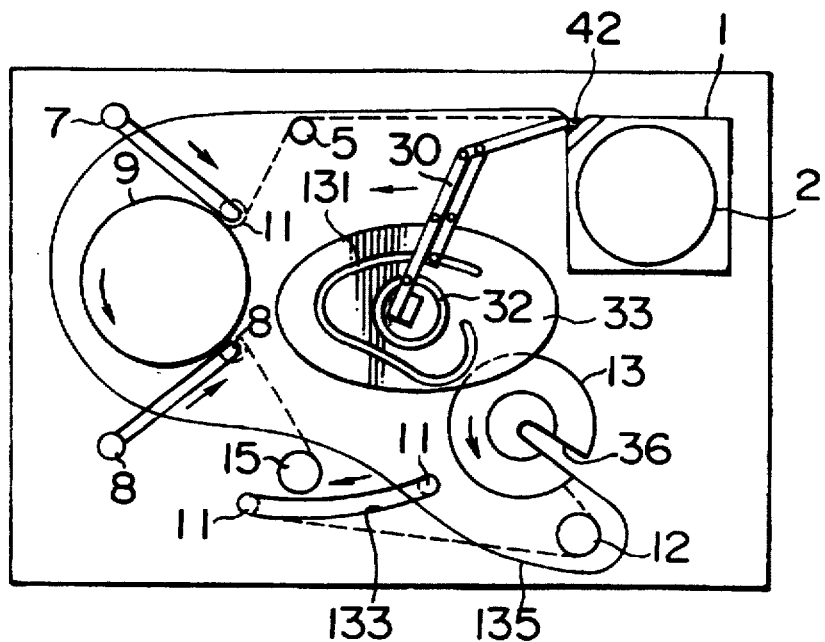
FIG. 25 is a plan view which illustrates the configuration of the elements of the tape path portion and a threading device of a magnetic recording and reproducing apparatus according to another embodiment of the present invention.

FIG. 25 is a plan view which illustrates a magnetic recording and reproducing apparatus arranged so that the capstan 15 and the guide rollers 11 and 12 are added between the rotative drum 9 and the take-up reel 13 in the structure shown in FIG. 14. The foregoing structure is so arranged that the magnetic tape is moved by the capstan such that a guide groove 133 forms the locus along which the guide roller 11 winds the magnetic tape 3 around the capstan 15. This embodiment is so structured that the magnetic tape is passed through the elements added to the foregoing structure shown in FIG. 10 and, accordingly, a cam groove 137 formed in the cam member 33 has a length longer than that of the cam groove 34 shown in FIG. 14 to correspond to the take-up reel.

Figure 26:
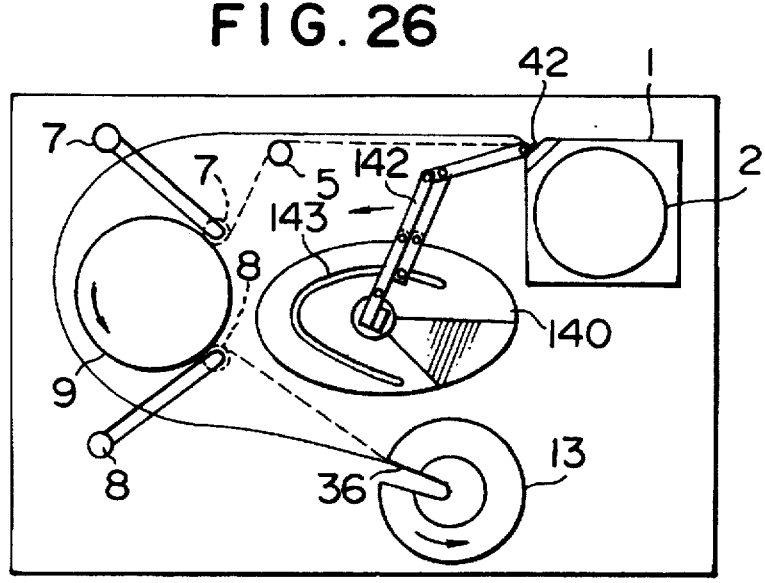
FIG. 26 is a plan view which illustrates the configuration of the elements of the tape path portion and a threading device of a magnetic recording and reproducing apparatus according to another embodiment of the present invention.
Figure 27:
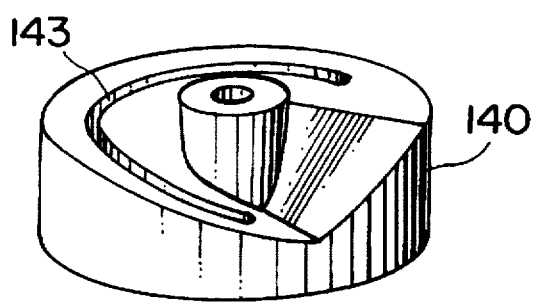
FIG. 27 is a perspective view which illustrates a cam member of the threading device shown in FIG. 26.

FIG. 26 is a plan view which illustrates a magnetic recording and reproducing apparatus according to another embodiment of the present invention and comprising a tape loading device in which the cam groove for forming the planar movement locus of the threading arm 30 and the function of the end-surface cam for determining the vertical directional position are integrated into a cam member 40. FIG. 27 is a perspective view which illustrates a cam member 140. The height of the upper surface of the cam member 140 is continuously changed. A cam groove 143 formed on the surface of the cam member 140 by machining has a constant depth.

Figure 28:
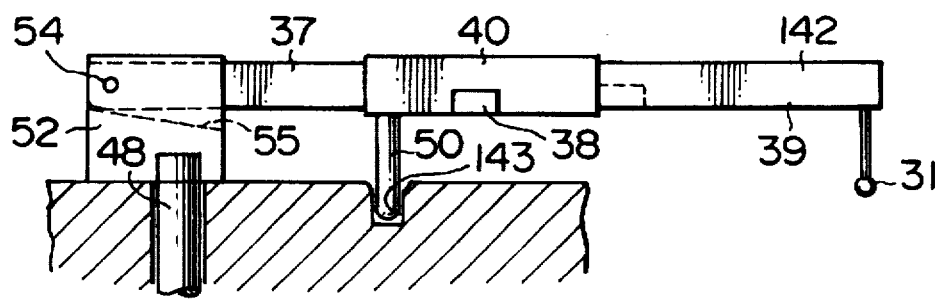
FIG. 28 is a side elevational view which illustrates the threading device of the magnetic recording and reproducing apparatus shown in FIG. 26.

FIG. 28 is a side elevational view which illustrates the threading arm 142 shown in FIG. 26. An arm center portion 145 receives the rotational force for rotating the threading arm 142 by way of a shaft 48 so that the arm center portion 145 is rotated. A portion of the leading portion of a groove pin 50 connected to a follower link member 40 is instead into the cam groove 143 so that the follower link member 40 is located in the horizontal plane. The schematic structure of the threading arm 142 is arranged to be Similar to the foregoing examples such that the threading arm 142 is made rotative around the pin 54 and a surface 55 which comes in contact with the main link memory 37 is inclined. Therefore, the vertical attitude is determined by the groove pin 50. The main link member 37 is made rotative in the vertical direction. The follower link members 40, 38 and 39 are connected to the other link members by pin members (omitted from illustration) respectively inserted in the vertical direction. Since the cam groove 143 is formed in the upper surface of the cam member 140 as described above, the change of the height of the foregoing surface enables setting to be so made that the leading block connected to the threading arm 142 passes through a proper position in the vertical direction.

The shape and dimensions of the cam groove 143 and the threading pin 31 must be determined while considering the change of the attitude of the threading arm 142.

Although this embodiment is so arranged that the depth of the cam groove 143 is made constant and the height of the surface, in which the cam groove 143 is formed, is changed, another structure may be employed in which the height of the surface, in which the cam groove 143 is formed, is not changed and only the depth of the cam groove 143 is changed if the groove pin 50 to be connected to the cam groove 143 has a sufficient length and if the change of the attitude of the threading arm 143 can be performed as desired.

Since this embodiment comprises the three-dimensional shape cam member 140 as described above, the cam groove 143 ranging over 360° can be formed around the rotation center of the threading arm 142. Therefore, this embodiment enables the tape to be loaded even if the tape passage is formed into a very complicated shape and developing in the vertical direction.

Figure 29:
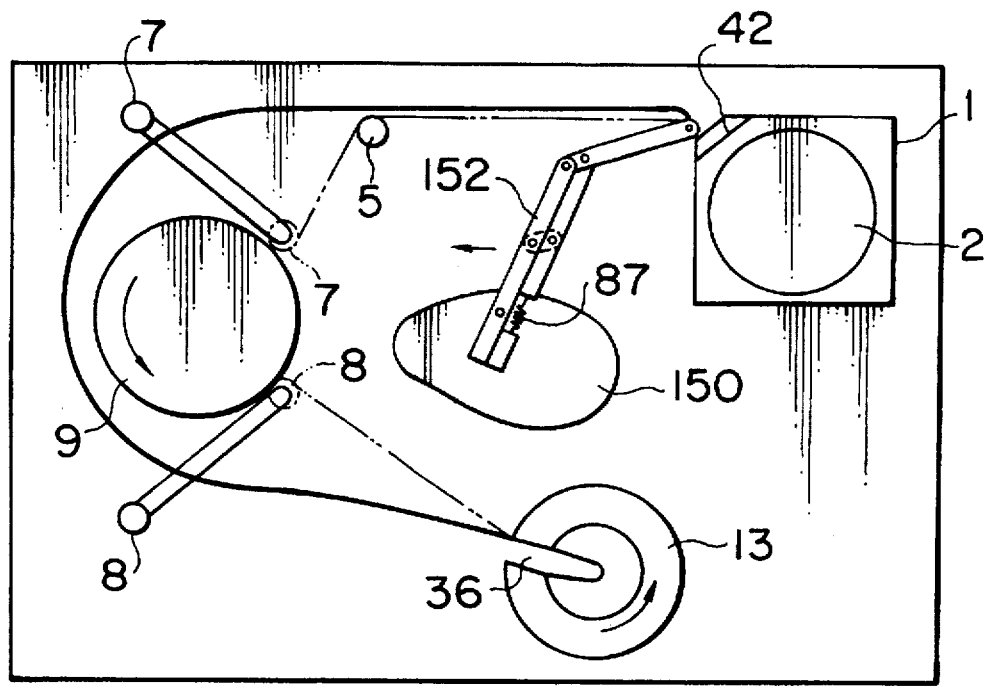
FIG. 29 is a plan view which illustrates the configuration of the elements of the tape path portion and a threading device of a magnetic recording and reproducing apparatus according to another embodiment of the present invention.
Figure 30:
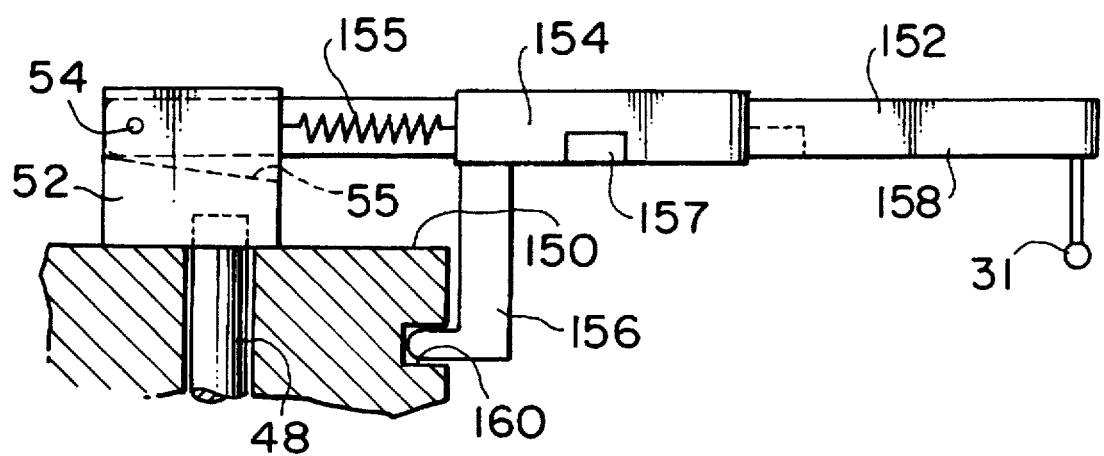
FIG. 30 is a side elevational view which illustrates the threading device of the magnetic recording and reproducing apparatus shown in FIG. 29.

FIG. 29 is a plan view which illustrates a magnetic recording apparatus according to another embodiment of the present invention. This embodiment comprises a threading arm 152 and a cam member 150 which are different from those according to the embodiment shown in FIG. 14. FIG. 30 is a side elevational view which illustrate the threading arm 152 and the cam member 150 shown in FIG. 29.

A spring 155 is fastened between the arm central portion 52 and the follower link member 154 so that tension is always effected between the two members 52 and 154. Further, the follower link member 154 has an L-shape member 156 fastened thereto, the L-shape member 156 having a leading portion which receives outward reaction from the cam member 150. Therefore, the tension of the spring 155 and the reaction received from the L-shape member 156 causes the follower link member 154 to be located as shown in FIG. 30. The threading arm 152 forms a panto-arm mechanism, and the state of the panto-arm mechanism is determined depending upon the positions of the follower link members 154, 157 and 158. Therefore, the change of the shape of the cam member 150 enables the locus of the threading arm 152 in the planar direction to be changed arbitrarily.

A mechanism for vertically operating the threading arm 152 will now be described. The threading arm 152 is made rotative and by the arm central portion 52 connected to the shaft 48 and also made rotative in the vertical direction around the pin by the inclined portion 55. As described above, the leading portion of the L-shape member 156 is inserted into a cam groove 160 formed in the side surface of the cam member 150 so that the vertical location is performed by the foregoing cam groove 160. Therefore, the attitude of the threading arm 152 is determined depending upon the vertical position of the cam groove 160. As a result of the structure thus-arranged, the change of the vertical position of the cam groove 160 enable the leading block 7 connected to the threading pin 31 disposed at the leading portion of the threading arm 152 to pass through a proper position in the vertical direction.

Figure 31:
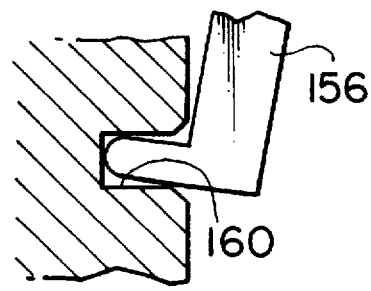
FIG. 31 is a partially enlarged view which illustrates the relationship between the threading arm member and a cam groove shown in FIG. 30.

FIG. 31 illustrates the relationship between the L-shape member 156 and the cam groove 160. As the change of the attitude of the threading arm 152, the attitude of the L-shape member 156 is also changed as illustrated.

Therefore, the shape and the dimensions of the cam groove 160 and the threading pin 31 according to this embodiment must be determined while considering the change of the attitude of the threading arm 152.

In this embodiment, the attitude of the threading device is controlled by making use of the cam groove in place of the arrangement according to the foregoing embodiment in which it is controlled by the dead weight of the threading arm. Therefore, effects can be obtained in that the threading operation can further be assured and, accordingly, the limit present on the weight of the threading arm and that on the direction of the disposition of the threading device can be eliminated.

Figure 32:
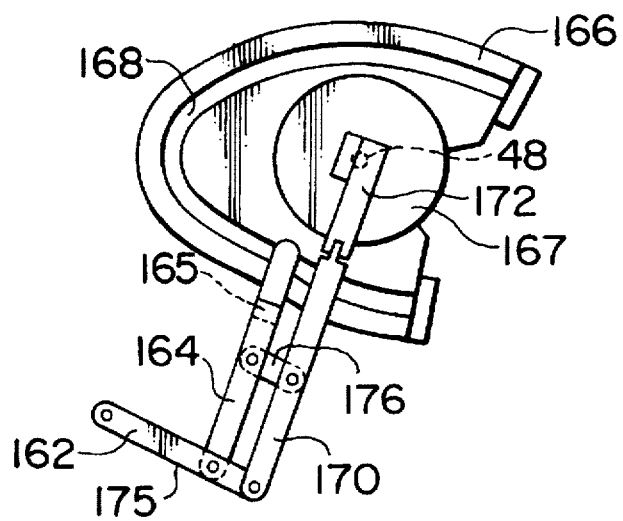
FIG. 32 is a plan view which illustrates the threading device according to another embodiment of the present invention.

FIG. 32 is a plan view which illustrates a central portion of the threading device according to another embodiment of the present invention. A threading arm 162 is rotated by the rotational force supplied from the shaft 48. A cam connection member 165 to be connected to a follower link member 164 has an end which is inserted into a cam groove 168 formed in a peripheral portion 166 of a cam member 167 to locate the follower link member 164 in the horizontal plane. The threading arm 162 forms a panto-arm mechanism, the state of which is determined depending upon the positional relationship between the follower link member 164 and a main link member 170.

Figure 33:
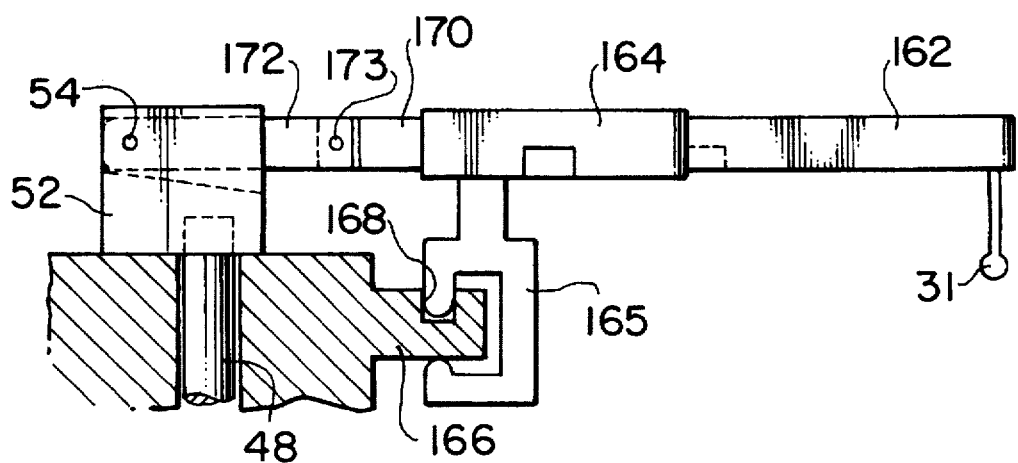
FIGS. 33 and 34 are side elevational views which illustrate the threading device shown in FIG. 32.

FIG. 33 is a side elevational view which illustrates the threading arm 162. A connection member 172 and the arm central portion 52 are connected to each other by the pin 54 to be rotative. Also the connection member 172 and the main link member 170 are connected to each other by a pin 173 to be rotative. As a result, the position and the inclination of the link member 170 of the threading arm 162 and those of its leading link member 175 connected to the link member 170 can be changed vertically.

However, the leading link member 175 is connected by the pin member inserted vertically into the surface forming the panto arm and, accordingly, the leading link members 164, 170, 176 and 175 have no mutual freedom in a direction perpendicular to a surface forming the panto arm. The cam connection portion 165 to be connected to the follower link member 164 is formed into a shape which holds a plate-like member at the central portion thereof such that it holds the peripheral portion 166 of the cam member 167 as shown in FIG. 33. By properly determining the dimensions of the cam connection member 165 and those of the cam groove 168, the position and the attitude of the cam connection member 165 can be fixed in the vertical plane. The cam connection member 165 is moved such that it is rotated horizontally while being connected to the cam groove 168. The dimensions of a U-shape portion of the cam connection member 165 must be determined carefully to prevent interference with the peripheral portion 166 of the cam member 167 at the time of the movement.

Since the vertical position of the peripheral portion 166 of the cam member 167 can be determined arbitrarily, the height of the cam connection member 165 and the vertical position of the leading portion of the threading arm 162 to be connected to the cam connection member 165 can arbitrarily be changed.

Figure 34:
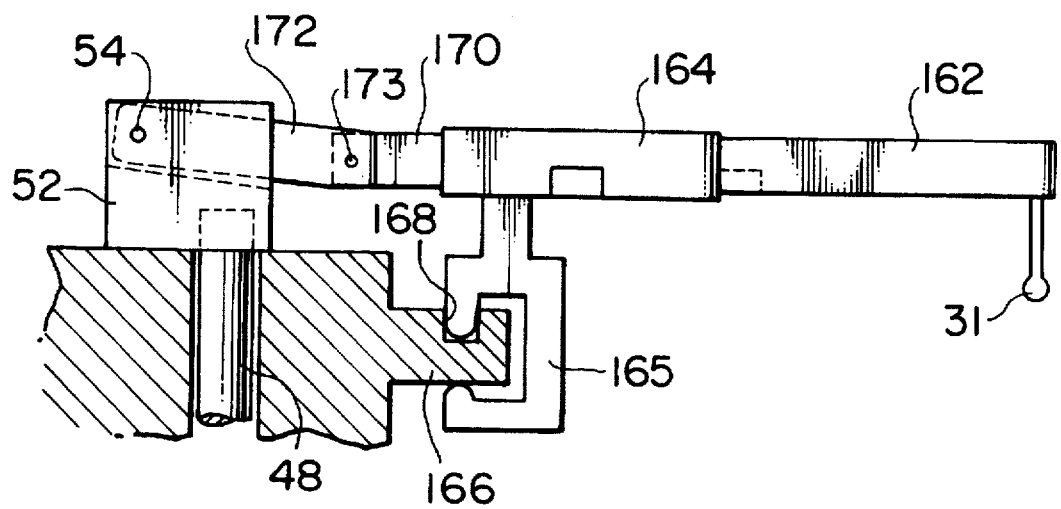

FIG. 34 illustrates a state where the peripheral portion 166 of the cam member 167 has been lowered and the leading portion of the threading arm 162 has been lowered. Since the operation of the tape threading device according to this embodiment is the same as that according to the embodiment shown in FIG. 14, its description is omitted here.

Figure 35:
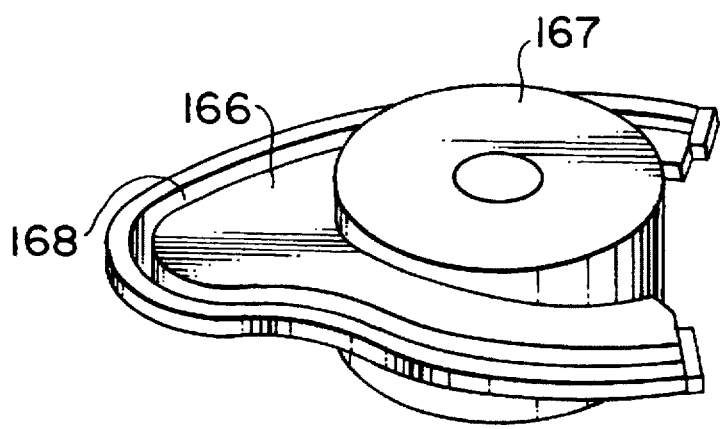
FIG. 35 is a perspective view which illustrates the cam member of the apparatus shown in FIG. 32.

FIG. 35 is a perspective view which illustrates the cam member 167 according to this embodiment, the cam member 167 having a central portion formed into a columnar shape having, on the periphery thereof, the plate-like peripheral portion 166 of the cam member 167. Further, the cam groove 168 having a predetermined depth is formed in the surface of the peripheral portion 166 of the cam member 167. The vertical position of the peripheral portion 166 of the cam member 167 and the shape of the cam groove 168 in the horizontal plane can arbitrarily be determined. Therefore, the locus of the three-dimensional operation of the arm can be determined.

In this embodiment, the structure for holding the plate-like member is employed to determine the attitude of the threading arm. Similarly to the foregoing embodiment, the dead weight of the threading arm is not used. Further, the limit on the weight of the tape threading arm and the limit on the direction of the installation of the tape threading device are not present. Since the pin 31 to be connected to the leading block is always made perpendicular in this embodiment, an effect can be obtained in that the leading block can be moved stably.

Figure 36:
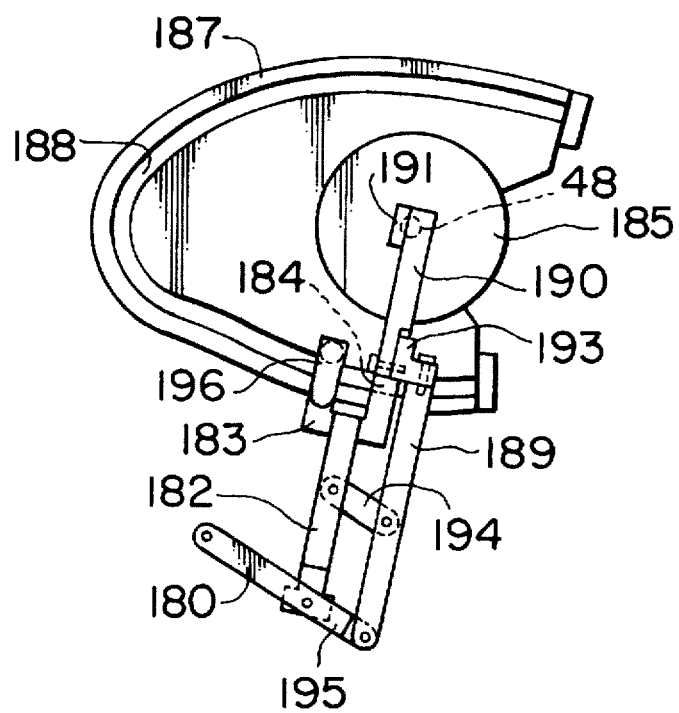
FIG. 36 is a plan view which illustrates the threading device according to another embodiment of the present invention.

FIG. 36 is a plan view which illustrates a central portion of a tape threading device according to another embodiment of the present invention. A threading arm 180 is rotated by the rotational force supplied from the shaft 48. A cam connection member 183 to be connected to a follower link member 182 has an end which is inserted into a cam groove 188 formed in the peripheral portion 187 of a cam member 185. The threading arm 180 for locating the follower link member 182 in the horizontal plane forms a panto mechanism. The positional relationship between the follower link member 182 and the link member 189 in the horizontal plane determines the state of the panto arm mechanism.

Figure 37:
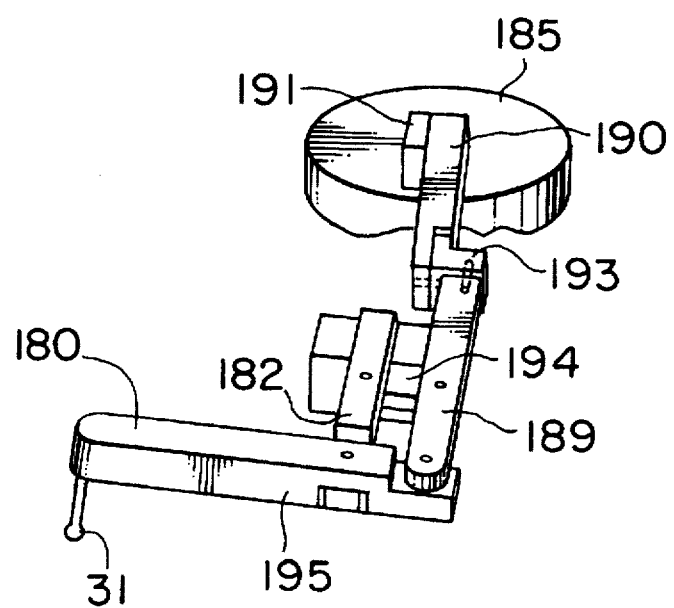
FIG. 37 is a perspective view which illustrates the apparatus shown in FIG. 36.

FIG. 37 is a perspective view which illustrates the threading arm 180. A member 190 and an arm central portion 191 are connected to each other by a pin to be made rotative. In this embodiment, a connection member 193 is additionally used to be rotatively connected to the member 190 by making use of a pin. As a result, the vertical position and the inclination of the connection member 193 can be varied. Further, a link member 189 is connected to the connection member 193 by making use of a pin such that axial direction of the link member 189 is made rotative. Similarly to the foregoing embodiment, the link members 189, 194 and 195 has no freedom with the follower link member 182 in the direction perpendicular to the surface forming the panto arm. As a result, the link members of the members forming the threading arm 180, that are disposed outside the connection member 193, can be vertically shifted. As a result, rotational freedom in the direction of the axis of the link member 189 can be realized.

Figure 38:
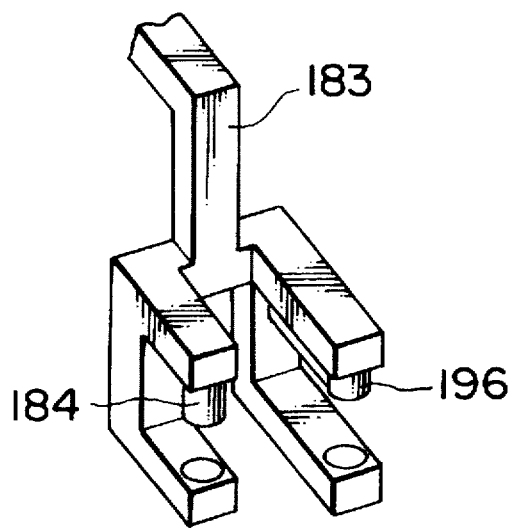
FIG. 38 is a perspective view which illustrates the cam connection member of the apparatus shown in FIG. 36.

FIG. 38 is a perspective view which illustrates the cam connection member. In contrast with the foregoing embodiment in which the cam connection member is, at one point, connected to the peripheral portion of the cam member, this embodiment has an arrangement that two U-shaped members are used to establish the connection with the peripheral portion 187 of the cam member. When the threading arm 180 is rotated, an end 184 is moved within the cam groove 188. Another end 196 is not introduced into the cam groove 188 but it holds the plate-like portion of the peripheral portion 187 of the cam member in its relatively wide portion.

Figure 39:
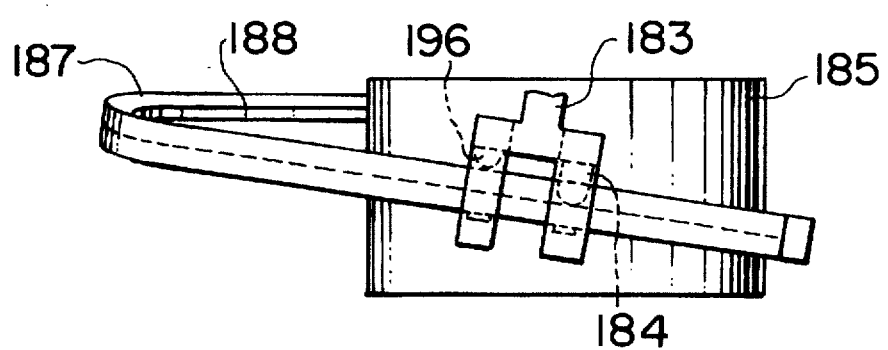
FIG. 39 is a side elevational view which illustrates the relationship between the cam connection member and the cam member of the apparatus shown in FIG. 36.

FIG. 39 illustrates the relationship between the cam connection member 183 and the cam member 185. The cam connection member 183 is connected to the peripheral portion 187 of the cam member at the two points as described above. The leading portion of the end 184 is so arranged to be in contact with the bottom portion of the cam groove 188, while the other end 196 holds the peripheral portion 187 of the plate-like cam member. As a result, the vertical position and the inclination angle of the cam connection member 183 are determined. Further, the interference with the periphery 187 of the cam member at the time of the movement of the cam connection member 183 must be prevented similarly to the foregoing embodiment.

The vertical position of the periphery 187 of the cam member can arbitrarily be determined. Further, the inclination of the periphery 187 is determined by the change ratio of the vertical position. As a result of the foregoing structure, the vertical position of the leading portion of the threading arm 180 to be connected to the cam connection member 183 can arbitrarily be changed. Further, the leading threading pin 31 can be caused to have a preferable angle at the time of the threading operation.

Figure 40:
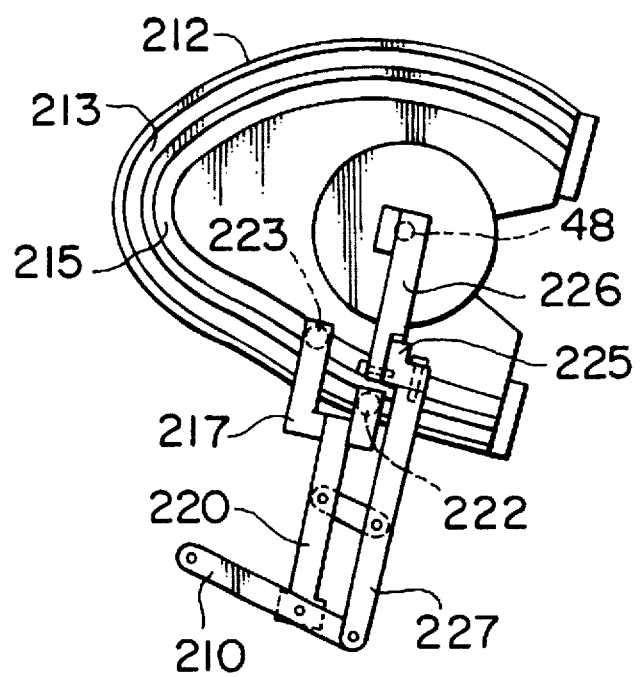
FIG. 40 is a plan view which illustrates the threading device according to another embodiment of the present invention.

FIG. 40 is a plan view which illustrates the central portion of a threading device according to another embodiment of the present invention. A threading arm 210 is rotated by rotational force of the shaft 48. This embodiment has an arrangement that two cam grooves 213 and 215 are formed in the periphery 212 of the cam member.

Figure 41:
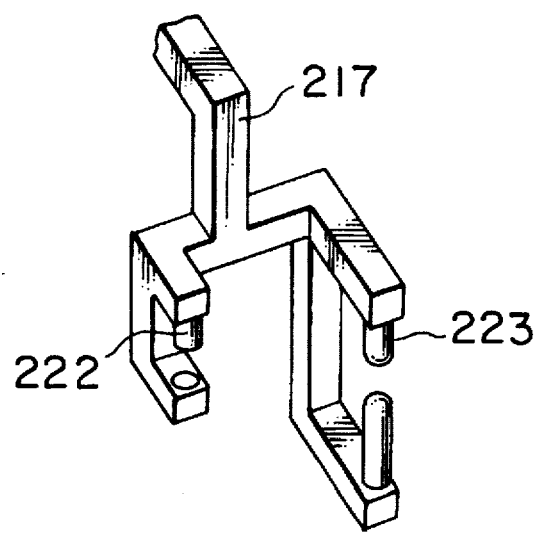
FIG. 41 is a perspective view which illustrates the cam connection member of the apparatus shown in FIG. 40.

FIG. 41 is a perspective view which illustrates a cam connection member 217. The cam connection member 217 to be connected to a follower link member 220 is composed of two U-shape members similarly to the foregoing embodiment. An end 222 of the connection member 217 is arranged to move within the cam groove 213, while another end 223 moves within the cam groove 215.

In this embodiment, a connection member 225 is used which is rotatively connected to a member 226 by making use of a pin similarly to the foregoing embodiment. As a result, the vertical position and the inclination of the member 225 can be varied. Further, a link member 227 is, by making use of a pin, rotatively connected to the member 225 in the direction of the axis of the link member. The link members 227, 228 and 229 and the follower link member 220 are connected to one another without freedom in the direction perpendicular to the surface forming the panto arm similarly to the foregoing embodiments. As a result of the foregoing structure, the vertical position of the link members of the members forming the threading arm 210, that are positioned outer more than the connection member 225, can be shifted. Further, the structure having rotational freedom in the direction of the axis of the member 227 is established.

Similarly to the foregoing embodiments, interference with the periphery of the cam member must be prevented at the time of the movement of the cam connection member 217. Since the two ends 222 and 223 of the cam connection member 217 has certain fixed positional relationship with respect to the central axis of the arm, the two cam grooves 213 and 215 must be adequately formed if the cam grooves 213 and 215 are formed inadequately, the cam connection member 217 interferes with the cam groove 230 and 231, resulting that the threading arm cannot be moved. The structure of the threading arm, the vertical positional movement of the leading portion of the threading arm and the inclination operation are substantially the same as the foregoing embodiments. A method of restricting the inclination angle of the cam connection member 217 is different from that according to the foregoing embodiments. An end 222 of the connection member is restricted by the vertical position of the cam groove 213, while another end 223 is restricted by the vertical position of the cam groove 215. As a result, the height and the inclination angle of the cam connection member 217 are determined. As a result, the change of the height of the two cam grooves enables the vertical height and the inclination of the cam connection member 217 can arbitrarily be determined.

This embodiment enables the vertical height and the inclination angle of the cam connection member 217 at each point to be individually determined by using the two three-dimensional cam grooves. Therefore, the leading block can be moved more precisely in order to protect the tape at the time of loading the tape.

Figure 42:
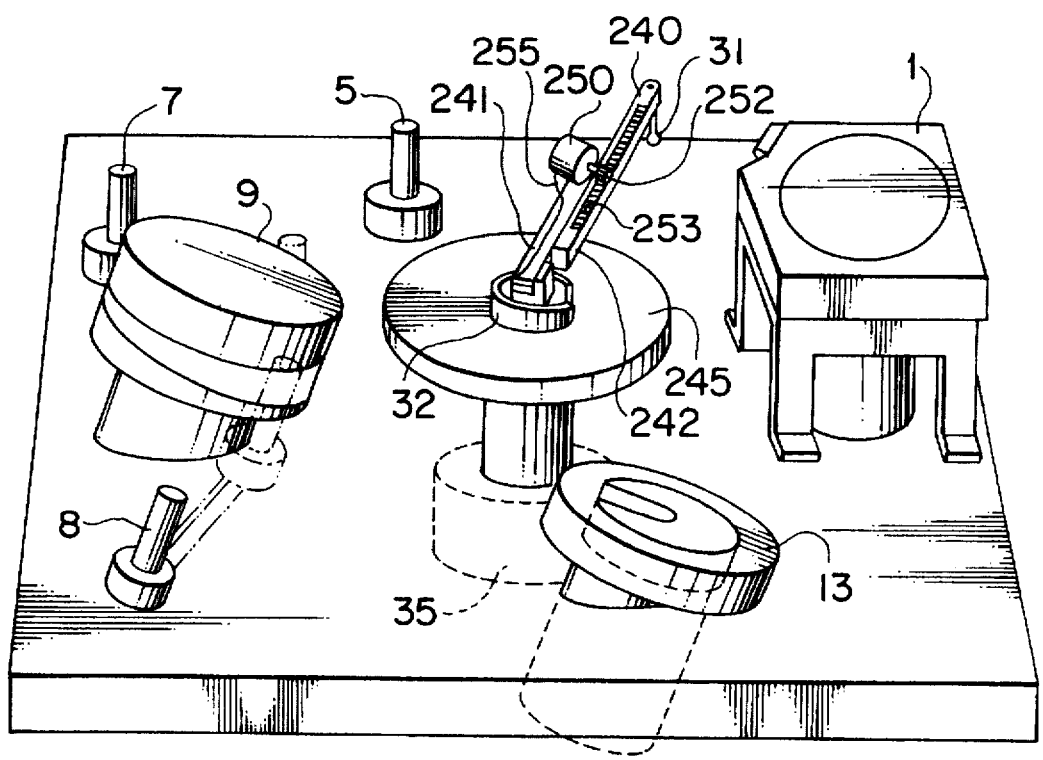
FIG. 42 is a plan view which illustrates the configuration of the elements of the tape path portion and a threading device of a magnetic recording and reproducing apparatus according to another embodiment of the present invention.

FIG. 42 is a perspective view which illustrates the structure of a magnetic recording and reproducing apparatus comprising a tape threading device according to another embodiment of the present invention. Although the operation of the tape threading arm in the foregoing embodiment is realized by the threading arm composed of a plurality of link members and the cam member, this embodiment realizes it by making use of a telescopic arm mechanism and a motor for driving the arm mechanism. A threading arm 240 is composed of two link members 241 and 242. The threading arm 240 is provided for a cam member 245, and the arm central portion 52 receives the rotational force from the shaft 48.

Figure 43:
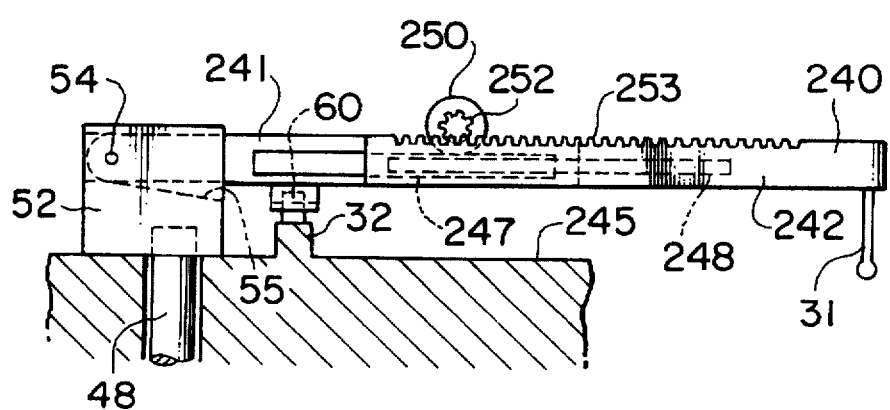
FIG. 43 is a side elevational view which illustrates the threading device of the magnetic recording and reproducing apparatus shown in FIG. 42.

FIG. 43 is a side elevational view which illustrates a threading arm 243. The link members 241 and 242 are connected to each other by linear guides 247 and 248. A motor 250 is placed on the link member 241, and a gear 252 is fastened to the leading portion of the rotational shaft of the motor 250. A linear gear, that is a rack 253, is disposed on the upper surface of the link member 242, the gear 252 and the teeth of the rack 253 being enabled to be engaged with one another. An output from a controller (omitted from illustration) rotates the motor 250, causing the link member 242 to be moved in parallel to the link member 241 due to the foregoing structure. As a result, the tape threading arm 240 is operated to be extended/contracted. The threading arm 240 is rotated by an arm drive motor 35 supplied with electric power through a line 255. The threading arm 240 is, due to the rotational operation and the extending/contracting operation, able to move the leading block connected to the threading pin 31 disposed at the leading portion of the arm 240 to an arbitrary position on a plane through which the threading arm 240 is able to pass.

An inclined surface 55 formed in the central portion 52 is operated similarly to that according to the foregoing embodiments.

Since the vertical positional operation of the tape threading arm 93 realized by the end-surface cam 32 and the roller 60 are the same as those according to the embodiment shown in FIG. 12, its description is omitted here.

Since this embodiment enables the planar operation to be realized without the cam and link mechanism, the degree of freedom of the locus of the operation can be improved. Therefore, this embodiment enables the tape to be loaded if the tape passage is formed further complexly and developed vertically.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A magnetic recording and reproducing apparatus into which a magnetic tape accommodated around a supply reel in a cartridge is loaded to record and reproduce information to and from said magnetic tape, said magnetic recording and reproducing apparatus comprising:

a cylindrical drum having a magnetic head for recording and reproducing information to and from said magnetic tape while being rotated;

a take-up reel for taking up said magnetic tape, said take-up reel being arranged such that a tape edge of a tape portion from said supply reel in said cartridge to said cylindrical drum has a predetermined angle of not 0° with respect to a tape edge of a tape portion from said cylindrical drum to said take-up reel;

a capstan for driving said magnetic tape;

a magnetic-tape threading means for extracting an end of said magnetic tape from said cartridge, wrapping said tape around said drum and by the capstan along a predetermined path and threading to said take-up reel, said magnetic-tape threading means comprising a threading pin, an arm, a link, a driving motor, a cam member and a cam follower member, which magnetic tape threading means performs a threading operation of said magnetic tape along a predetermined three dimensional path; and a tape guide means which moves from a first position not in contact with said tape to a second position wrapping said tape around said drum at a predetermined timing with respect to tape threading motion and which moves from said second position to said first position during a reinstalling of said tape into said cartridge.

2. A magnetic recording and reproducing apparatus according to claim 1 wherein said capstan is a vacuum capstan for vacuum sucking said magnetic tape and said apparatus further comprises a movable tape guide for wrapping said tape around said capstan when said tape is fully loaded, said movable tape guide being movable around said capstan.

* * * * *